(12) United States Patent
Neil

(10) Patent No.: US 8,046,679 B2
(45) Date of Patent: Oct. 25, 2011

(54) APPARATUS, METHOD AND MACHINE-READABLE MEDIUM FOR FACILITATING GENERATION OF A MARKUP LANGUAGE DOCUMENT CONTAINING IDENTICAL SETS OF MARKUP LANGUAGE ELEMENTS

(75) Inventor: Tim Neil, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 1667 days.

(21) Appl. No.: 11/345,326

(22) Filed: Feb. 2, 2006

(65) Prior Publication Data

US 2007/0180360 A1    Aug. 2, 2007

(51) Int. Cl.
*G06N 3/00*    (2006.01)
(52) U.S. Cl. ...................................................... 715/234
(58) Field of Classification Search .................. 715/234, 715/243, 254
See application file for complete search history.

(56) References Cited

U.S. PATENT DOCUMENTS

| | | | | |
|---|---|---|---|---|
| 6,336,124 | B1 * | 1/2002 | Alam et al. | 715/205 |
| 2003/0060896 | A9 | 3/2003 | Hulai et al. | |
| 2004/0153968 | A1 * | 8/2004 | Ching et al. | 715/513 |
| 2007/0044012 | A1 * | 2/2007 | Suver et al. | 715/513 |
| 2007/0276646 | A1 * | 11/2007 | Dutt et al. | 703/22 |

FOREIGN PATENT DOCUMENTS

GB    2414820 A    7/2005

OTHER PUBLICATIONS

W3C: "XML" Inclusions (XInclude) Version 1.0 W3C Working Draft May 16, 2001, Internet, May 16, 2001, pp. 1-12, http://www.w3.org/TR/2001/WD-xinclde-20010516.
W3C: "XML Pointer Language (XPointer) W3C Working Draft Dec. 1999" Internet, Dec. 6, 1999, pp. 1-23, http://w3.org/TR/199/WD-xptr-19991206.
St. Laurent O'Reilly & Associates, "The XPointer xinclude( ) Scheme draft-stlaurent-xinclude-frag-00.txt", IETF Standard-Working-Draft, Internet Engineering Task Force, IETF, CH, Oct. 28, 2002.
Zvon.Org: "Xinclude Tutorial", ZVON (online) 2005, p. 1-16, URL:http://ww.zvon.org/xxl/XIncldueTutorial/Output/contents.html>.
Seth, M. "XInclude-Introduction and Usage", Internet, Jan. 29, 2004.
Anonymous, XML Inclusions (XInclude) Version 1.0, Internet, May 16, 2001.
Abrams, M. et al. "User Interface Markup Language" (UIML) Specification, Harmonia (Online), Feb. 8, 2002, pp. 1-116. URL:http://ww.uiml.org/specs/docs/uim130.
European Patent Office communication issued Aug. 9, 2010, in relation to European Patent Application No. 06101233.2 filed Feb. 2, 2006.

* cited by examiner

*Primary Examiner* — Kyle Stork

(57) ABSTRACT

From a markup language document (e.g. an Extensible Markup Language (XML) document expressed as a Document Object Model (DOM) tree) having a markup language element hierarchy containing a set of markup language elements and a plurality of references to the hierarchy, another markup language document (e.g. a textual XML document) is generated which contains one instance of the set of markup language elements for each of the plurality of references. The generated markup language document may otherwise have the same content as the original markup language document. Generation of a markup language document containing identical sets of markup language elements may thereby be simplified.

15 Claims, 19 Drawing Sheets

```
1   ..
2   <FUNCTIONS>
3     <FUNCTION NAME="Function1">
4       <ACTION TYPE="ARML" >
5         <ARMLTEXT>
6           <PKG TYPE="LOGINMSG">
7             <LOGINMSG USERNAMEFIELD="SMITHJ" PASSWORDFIELD="ABC321" />
8           </PKG>
9         </ARMLTEXT>
10      </ACTION>
11      <ACTION TYPE="NOTIFY" />
12      <ACTION TYPE="NOTIFY"/>
13    </FUNCTION>
14    <FUNCTION NAME="Function2">
15      <ACTION ... >
16      ..
17      <ACTION ... >
18    </FUNCTION>
19  </FUNCTIONS>
20  ..
21  <DEVICES>
22    <DEV TYPE="CE" >
23      <SCREENS STSCRN="YES">
24        <SCREEN NAME="LoginScr" TITLE="Login">
25          <TEXTITEMS>
26            <TI NAME="TextItem1" INDEX="0" CAPTION="Press the Button to Log In"
27                X="28" Y="17" />
28          </TEXTITEMS>
29          <BUTTONS>
30            <BTN NAME="Button1" CAPTION="OK" INDEX="0" X="28" Y="64">
31              <EVENTS>
```

FIG. 17A

```
32              <EVENT TYPE="BUTTONCLICK">
33                  <FNCALL NAME="CallFn1" CALLEDFN="Function1"/>
34                  <ACTION TYPE="ALERT" CAPTION="Informational Message"
35                      TEXT="Message Sent."/>
36              </EVENT>
37             </EVENTS>
38            </BTN>
39          </BUTTONS>
40        </SCREEN>
41        <SCREEN NAME="LoginScrFrench" TITLE="Ouverture">
42          <TEXTITEMS>
43            <TI NAME="TextItem2" INDEX="0"
44                CAPTION="Appuyez sur le bouton pour ouvrir une session" X="28" Y="17"/>
45          </TEXTITEMS>
46          <BUTTONS>
47            <BTN NAME="Button2" CAPTION="OK" INDEX="0" X="28" Y="64">
48              <EVENTS>
49                <EVENT TYPE="BUTTONCLICK">
50                  <FNCALL NAME="CallFn1" CALLEDFN="Function1"/>
51                  <ACTION TYPE="ALERT" CAPTION="Message Informationnel"
52                      TEXT="Le message a envoyé."/>
53                </EVENT>
54              </EVENTS>
55            </BTN>
56          </BUTTONS>
57        </SCREEN>
58        :   (more screens)
59      </SCREENS>
60    </DEV>
61  </DEVICES>
62  :
```

1702 → <EVENT TYPE="BUTTONCLICK">  ← 150

```
1   ...
2   <DEVICES>
3     <DEV TYPE="CE">
4       <SCREENS STSCRN="YES">
5         <SCREEN NAME="LoginScr" TITLE="Login">
6           <TEXTITEMS>
7             <TI NAME="TextItem1" INDEX="0" CAPTION="Press the Button to Log In"
8                 X="28" Y="17" />
9           </TEXTITEMS>
10          <BUTTONS>
11            <BTN NAME="Button1" CAPTION="OK" INDEX="0" X="28" Y="64">
12              <EVENTS>
13                <EVENT TYPE="BUTTONCLICK">
14                  <ACTION TYPE="ARML" >
15                    <ARMLTEXT>
16                      <BODY TYPE="LOGINMSG">
17                        <LOGINMSG USERNAMEFIELD="SMITHJ"
18                                  PASSWORDFIELD="ABC321"  />
19                      </BODY>
20                    </ARMLTEXT>
21                  </ACTION>
22                  <ACTION TYPE="NOTIFY" />
23                  <ACTION TYPE="NOTIFY"/>
24                  <ACTION TYPE="ALERT" CAPTION="Informational Message"
25                          TEXT="Message Sent." />
26                </EVENT>
27              </EVENTS>
28            </BTN>
29          </BUTTONS>
30        </SCREEN>
31        <SCREEN NAME="LoginScrFrench" TITLE="Ouverture">
```

58

```
32   <TEXTITEMS>
33     <TI NAME="TextItem2" INDEX="0"
34       CAPTION="Appuyez sur le bouton pour ouvrir une session" X="28" Y="17" />
35   </TEXTITEMS>
36   <BUTTONS>
37     <BTN NAME="Button2" CAPTION="OK" INDEX="0" X="28" Y="64">
38       <EVENTS>
39         <EVENT TYPE="BUTTONCLICK">
40           <ACTION TYPE="ARML">
41             <ARMLTEXT>
42               <BODY TYPE="LOGINMSG">
43                 <LOGINMSG USERNAMEFIELD="SMITHJ" PASSWORDFIELD="ABC321"
44                 />
45             </ARMLTEXT>
46           </ACTION>
47           <ACTION TYPE="NOTIFY" />
48           <ACTION TYPE="NOTIFY"/>
49           <ACTION TYPE="ALERT" CAPTION="Message Informationnel"
50             TEXT="Le message a envoyé." />
51         </EVENT>
52       </EVENTS>
53     </BTN>
54   </BUTTONS>
55   </SCREEN>
56   ; (more screens)
57   </SCREENS>
58  </DEV>
59  </DEVICES>
60  ..
```
← 58

FIG. 18B

APPARATUS, METHOD AND MACHINE-READABLE MEDIUM FOR FACILITATING GENERATION OF A MARKUP LANGUAGE DOCUMENT CONTAINING IDENTICAL SETS OF MARKUP LANGUAGE ELEMENTS

COPYRIGHT NOTICE

A portion of the disclosure of this patent document contains material which is subject to copyright protection. The copyright owner has no objection to the facsimile reproduction by any one of the patent document or patent disclosure, as it appears in a Patent Office patent file or records, but otherwise reserves all copyright rights whatsoever.

FIELD OF THE INVENTION

The present invention relates to markup languages, and more particularly to an apparatus, method and machine-readable medium for facilitating generation of a markup language document containing identical sets of markup language elements.

BACKGROUND OF THE INVENTION

The use of markup languages such as Extensible Markup Language (XML) is prevalent in modern computing. This is likely due in part to fact that markup language documents may be expressed in a simple textual form which can be processed by many different types of computing devices and operating system platforms. Markup language documents may thus facilitate cross-platform computing.

When a developer creates a markup language document, either using a text editor or through the use of an integrated development environment (IDE), it may be necessary to repeatedly generate the same set of markup language elements within the document. The repeated generation of the same set of markup language elements can be tedious and can result in a markup language document that is difficult to maintain.

An apparatus, method and machine-readable medium for facilitating generation of a markup language document containing identical sets of markup language elements would be desirable.

BRIEF DESCRIPTION OF THE DRAWINGS

In the figures which illustrate example embodiments of this invention:

FIGS. 17A-17B textually illustrate a master definition Document Object Model (DOM) tree that is maintained in the memory of the RAD tool of FIG. 12 during mobile application design to represent the screens of FIGS. 15 and 16; and FIGS. 18A-18B illustrate a master definition file which results from the serialization of the DOM tree of FIGS. 17A-17B.

DETAILED DESCRIPTION

Figure 1:
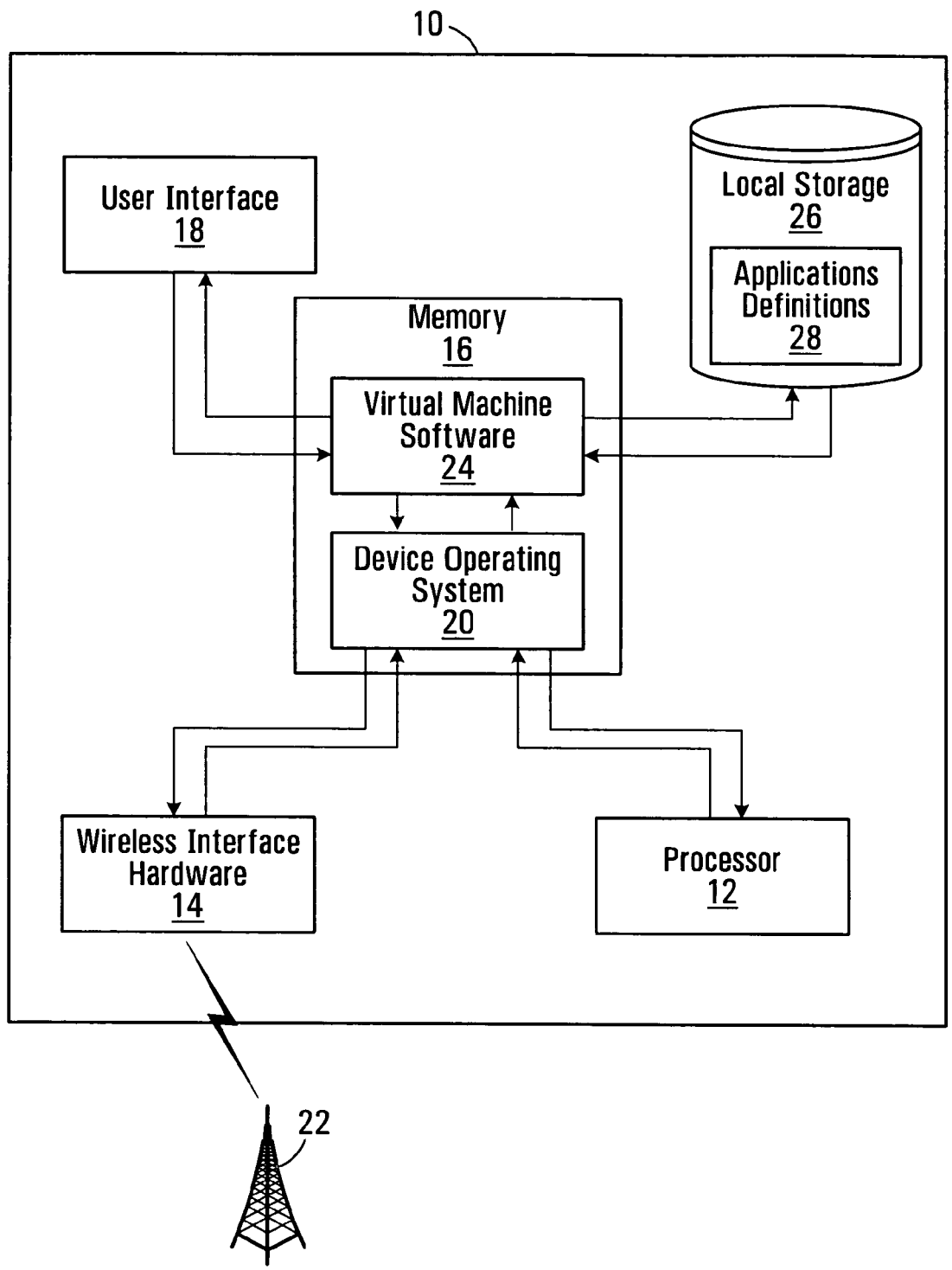
FIG. 1 schematically illustrates a wireless communication device including virtual machine software.

The embodiment described herein pertains to an apparatus, method and machine-readable medium for facilitating generation of a markup language document containing identical sets of markup language elements. The embodiment is described, however, within the specific context of a system that presents server-side applications at varied wireless communication devices (also referred to as "mobile devices").

The system for presenting server-side applications at varied wireless communication devices which serves as the context for the present description was originally described in U.S. Patent Publication No. US 2003/0060896 (which is hereby incorporated by reference hereinto). This system is referred to as the "baseline system" for convenience. An overview of the baseline system is initially provided below under the section heading "I. Baseline System Facilitating Execution of Server-Side Applications At Wireless communication devices" to provide a context for the description which follows. Thereafter, a description of a rapid application development (RAD) tool exemplary of an embodiment of the present invention which may be used to facilitate creation of master definition file for use in the baseline system is provided under the section heading "II. Rapid Application Development Tool".

In one aspect of the below-described embodiment, there is provided an apparatus comprising: at least one processor; and a memory coupled to the at least one processor storing: a markup language document containing: a markup language element hierarchy containing a set of markup language elements; and a plurality of references to the markup language element hierarchy; and machine-executable code which, when executed by the at least one processor, generates, from the markup language document, another markup language document containing one instance of the set of markup language elements for each of the plurality of references.

In another aspect of the below-described embodiment, there is provided a machine-readable medium comprising: machine-executable code for generating, from a markup language document containing: a markup language element hierarchy containing a set of markup language elements; and a plurality of references to the markup language element hierarchy, another markup language document containing one instance of the set of markup language elements for each of the plurality of references.

In yet another aspect of the below-described embodiment, there is provided a method comprising: generating, from a markup language document containing: a markup language element hierarchy containing a set of markup language elements; and a plurality of references to the markup language element hierarchy, another markup language document containing one instance of the set of markup language elements for each of the plurality of references.

I. System Facilitating Execution of Server-Side Applications at Wireless Communication Devices In overview, a system which facilitates execution of server-side applications at wireless communication devices utilizes a text-based application definition file to govern the manner in which an application is presented at a wireless communication device. The application definition file contains a description of how an application is to be presented at wireless communication device, the format of transactions over the wireless network, and a format of data related to the application to be stored at the wireless communication device. The application definition file of the present embodiment is written in Extensible Markup Language (XML). A virtual machine software component at the wireless communication device interprets the definition file and presents an interface to the application in accordance with the definition file.

FIG. 1 illustrates a wireless communication device 10, exemplary of an embodiment of the present invention. Wireless communication device 10 may be any conventional wireless communication device, modified to function in the manner described below. As such, wireless communication device 10 includes a processor 12, in communication with a network interface 14, storage memory 16, and a user interface 18 typically including a keypad and/or touch-screen. Network interface 14 enables device 10 to transmit and receive data over a wireless network 22. Wireless communication device 10 may be, for example, be a Research in Motion (RIM) two-way paging device, a WinCE based device, a PalmOS device, a WAP-enabled mobile telephone, or the like. Memory 16 of device 10 stores a mobile operating system such as the PalmOS, or WinCE operating system software 20. Operating system software 20 typically includes graphical user interface and network interface software having suitable application programmer interfaces ("API"s) for use by other applications executing at device 10.

Memory at device 10 further stores virtual machine software 24 which, when executed by wireless communication device 10, enables device 10 to present an interface for server-side applications provided by a transaction server, described below. Specifically, virtual machine software 24 interprets a textual application definition file (a markup language document) defining a definition of a user interface 18 controlling application functionality, and the display format (including display flow) at device 10 for a particular server-side application; the format of data to be exchanged over the wireless network for the application; and the format of data to be stored locally at device 10 for the application. Virtual machine software 24 uses operating system 20 and associated APIs to interact with device 10, in accordance with the received application definition file. In this way, device 10 may present interfaces for a variety of applications, stored at a server. From the perspective of operating system 20, virtual machine software 24 is viewed as another application resident at device 10. Moreover, multiple wireless devices each having a similar virtual machine software 24 may use a common server-side application in combination with an application definition file, to present a user interface and program flow specifically adapted for the device.

As such, and as will become apparent, the exemplary virtual machine software 24 is specifically adapted to work with the particular wireless communication device 10. Thus if device 10 is a RIM BlackBerry device, virtual machine software 24 is a RIM virtual machine. Similarly, if device 10 is a PalmOS or WinCE device, virtual machine software 24 would be a PalmOS or a WinCE virtual machine. As further illustrated in FIG. 1, virtual machine software 24 is capable of accessing local storage 26 at device 10.

In the present example, the application definition file is formed using the well-known markup language XML. Defined XML entities are understood by the virtual machine software 24. Defined XML entities are detailed in Appendix "A", attached hereto. AIRIX™ Markup Language (ARML) is an XML markup language used in the present embodiment. The defined XML entities are interpreted by the virtual machine software 24, and may be used as building blocks to present server-side applications at wireless communication device 10, as detailed herein.

Figure 2A:
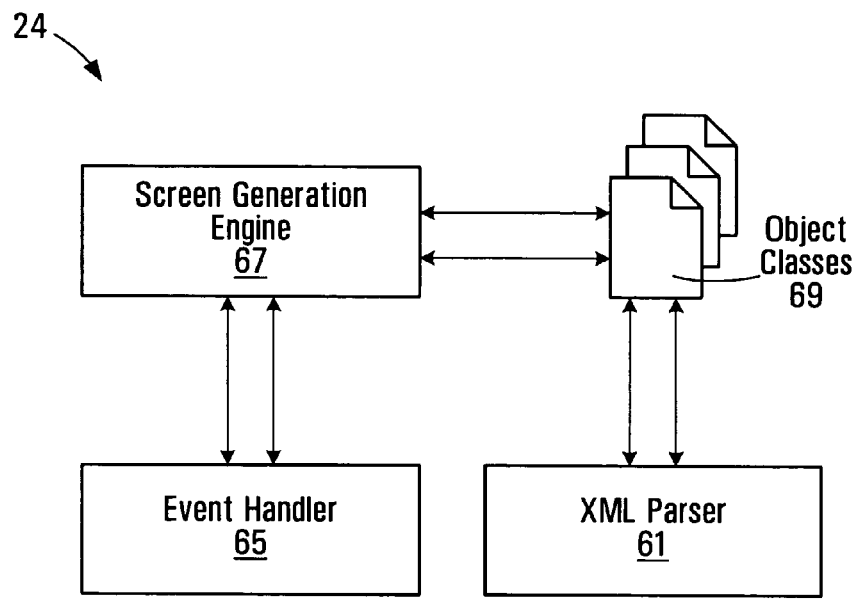
FIG. 2A illustrates the organization of exemplary virtual machine software at the wireless communication device of FIG. 1.

Specifically, as illustrated in FIG. 2A, virtual machine software 24 includes a conventional XML parser 61; an event handler 65; a screen generation engine 67; and object classes 69 corresponding to XML entities supported by the virtual machine software 24, and possibly contained within an application definition file 28. Supported XML entities are detailed in Appendix "A". A person of ordinary skill will readily appreciate that those XML elements and attributes identified in Appendix "A" are exemplary only, and may be extended, or shortened as desired, as described in section II hereinafter for example.

XML parser 61 may be formed in accordance with the Document Object Model, or DOM, which is available at www.w3.org/DOM/ and is incorporated by reference hereinto. Parser 61 enables virtual machine software 24 to read an application definition file. Using the parser, the virtual machine software 24 may form a binary representation of the application definition file for storage at the wireless communication device, thereby eliminating the need to parse text each time an application is used. Parser 61 may convert each XML tag contained in the application definition file, and its associated data to tokens, for later processing. As will become apparent, this may avoid the need to repeatedly parse the text of an application definition file.

Screen generation engine 67 displays initial and subsequent screens at the wireless communication device, in accordance with an application definition 28, as detailed below.

Event handler 65, of virtual machine software 24 allows device 10 under control of virtual machine software 24 to react to certain external events. Example events include user interaction with presented graphical user interface (GUI) screens or display elements, incoming messages received from a wireless network, or the like.

Object classes 69 also form part of virtual machine 24 and define objects that allow device 10 to process each of the supported XML entities at the wireless communication device. Each of object classes 69 includes attributes (e.g. fields or data members) used to store parameters defined by the XML file (XML element and/or attribute values), and allowing the XML entity to be processed at the wireless communication device, as detailed in Appendix "A", for each supported XML entity. Virtual machine software 24 may be expanded to support XML entities not detailed in Appendix "A".

As detailed below, upon invocation of a particular application at wireless communication device 10, the virtual machine software 24 presents an initial GUI screen based on the contents of the application definition 28 for the application. GUI screen display elements (e.g. menu items, text items, buttons, etc.) are created by screen generation engine 67 by creating instances of corresponding object classes for defined elements, as contained within object classes 69. The object instances are "customized" using XML element and attribute values contained in the application definition file 28. Thereafter the event handler 65 of the virtual machine software 24 reacts to events for the application. The manner in which the event handler reacts to events is governed by the contents of the application definition file. Events may trigger processing defined within instances of associated "action" objects, which objects are instantiated from object classes 69 of virtual machine software 24.

Similarly, object classes 69 of virtual machine software 24 further include object classes corresponding to data tables and network transactions defined in the Table Definition and Package Definition sections of Appendix "A". At run time, instances of object classes corresponding to these classes are created and populated with parameters contained within application definition file, as required.

Figure 2B:
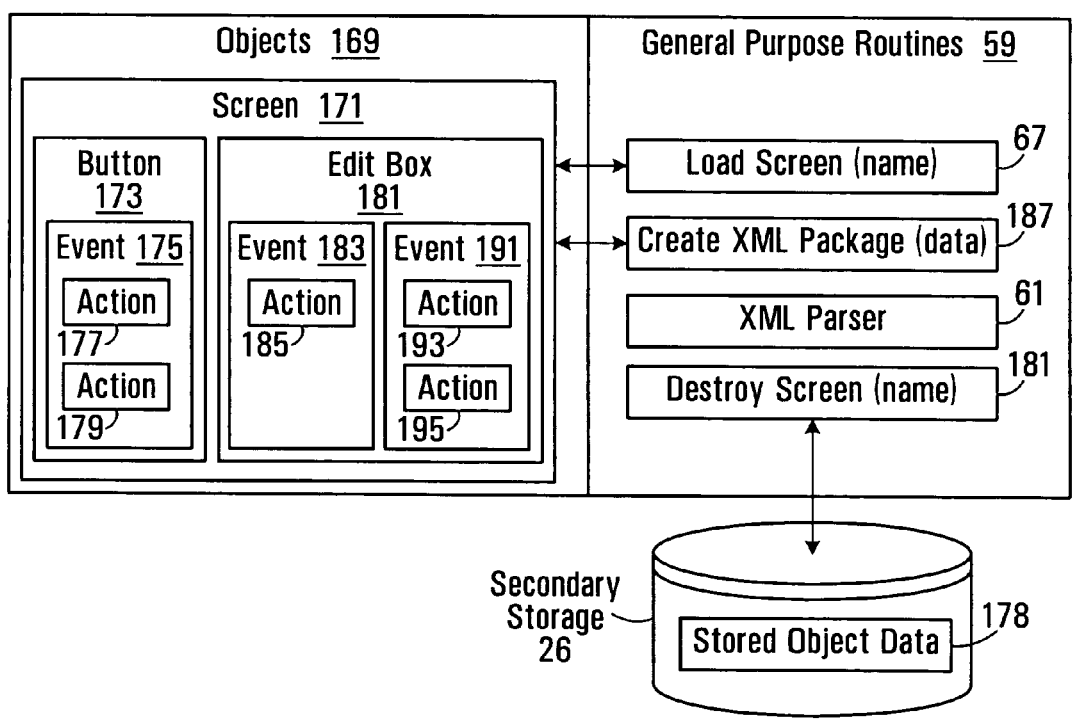
FIG. 2B further illustrates the organization of exemplary virtual machine software at the wireless communication device of FIG. 1.

FIG. 2B illustrates in greater detail the manner in which the virtual machine software 24 of FIG. 2A may be organized. For purposes of FIG. 2B it is assumed that the wireless communication device 10 is currently executing a wireless communication device application (also referred to as a "mobile application"). As illustrated, the virtual machine software 24 has two categories of components, namely, objects 169 and general purpose routines 59.

Objects 169 are instantiations of object classes 69 (FIG. 2A) which are instantiated dynamically at run time when the application is executed at the wireless communication device 10. The types of objects 169 that are instantiated at any given moment (e.g. screens, buttons, events, actions, etc., as will be described) depend upon the mobile application currently being executed and its state, including which user interface screen is currently displayed at the wireless communication device. Each of objects 169 corresponds to an application component defined within the application definition file 28. The objects 169 are instantiated from binary representations 178 thereof which are maintained in secondary storage 26, which representations 178 are created when the application definition file 28 is initially parsed. Each object 169 contains methods which capture certain behaviours that are performed by all instances of the represented object, as well as data members which permit the characteristics or behavior of the object to be "customized" (e.g. each instance of a button object may include the same highlight( ) method which, if invoked, causes the button to become highlighted, and may further include X and Y coordinate data member values which define a unique location of the button on the encompassing UI screen). A more detailed description of the exemplary set of objects 169 of FIG. 2B is provided below in conjunction with the description of operation of wireless computing device 10.

General purpose routines 59, on the other hand, constitute a managing environment for the objects 169. The routines 59 encompass functionality which is useful for executing a mobile application at the wireless communication device but is not necessarily tied to a particular type of object 169. For example, the routines 59 may include the XML parser 61, which initially parses the application definition file 28. Other routines may facilitate loading or closing of UI screens, or the sending of messages over the wireless network 22, as will be described. The routines 59 effectively consolidate certain functionality for convenient invocation from any of objects 169, as required.

Using this general description and the description which follows, persons of ordinary skill in the art will be able to form virtual machine software 24 for any particular device. Typically, virtual machine software 24 may be formed using conventional object-oriented programming techniques, and existing device libraries and APIs, as to function as detailed herein. As will be appreciated, the particular format of screen generation engine 67, object classes 69 will vary depending on the type of virtual machine software, its operating system and API available at the device. Once formed, a machine executable version of virtual machine software 24 may be loaded and stored at a wireless communication device, using conventional techniques. It can be embedded in ROM, loaded into RAM over a network, or from a computer readable medium.

Although, in the described embodiment the virtual machine software 24 and software forming object classes 69 are formed using object-oriented structures, persons of ordinary skill will readily appreciate that other approaches could be used to form suitable virtual machine software. For example, object classes 69 forming part of the virtual machine could be replaced by equivalent functions, data structures or subroutines formed using a conventional (i.e. non-object-oriented) programming environment. Operation of virtual machine software 24 under control of an application definition file containing various XML definitions exemplified in Appendix "A" is further detailed below.

Figure 3:
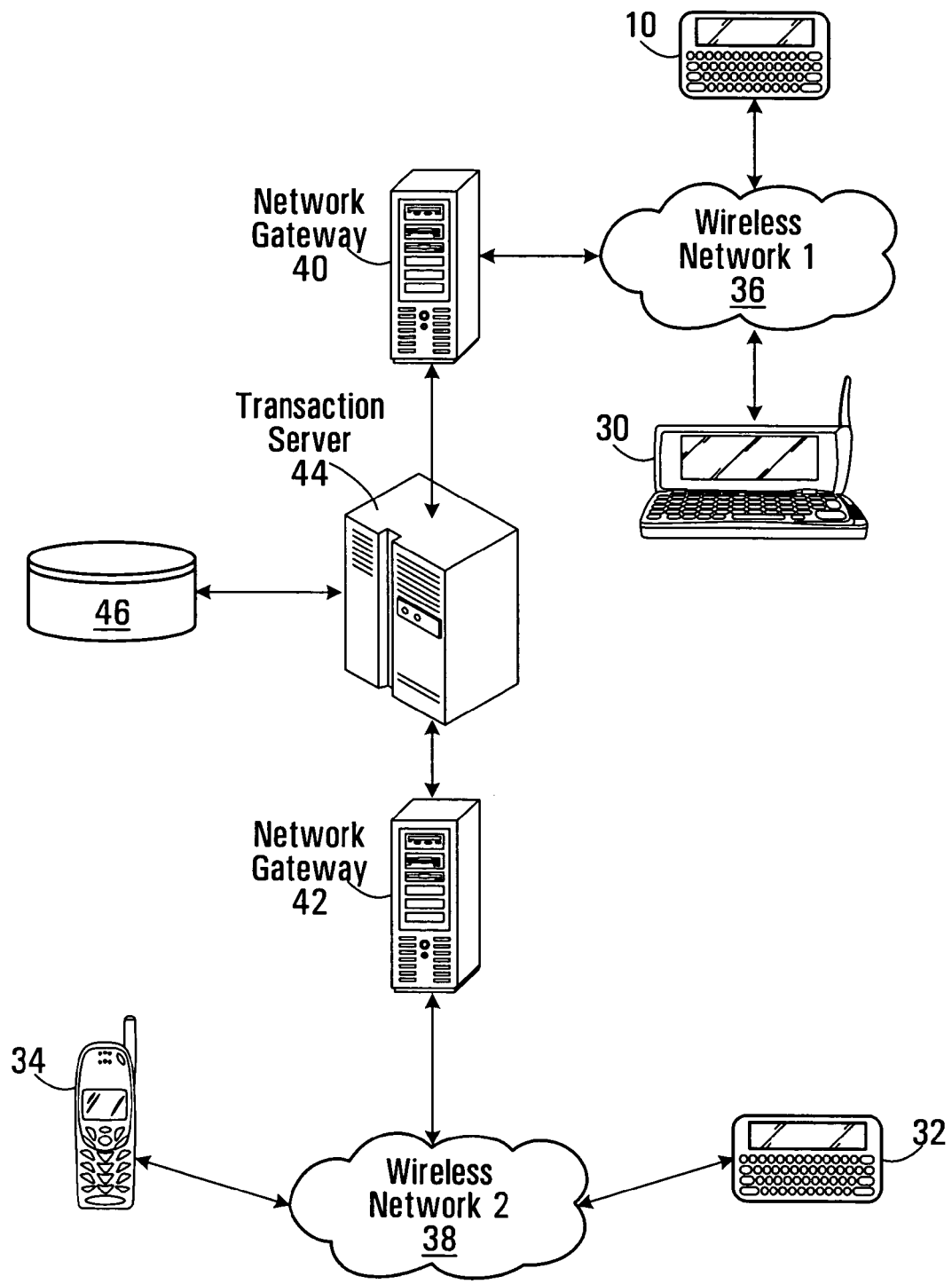
FIG. 3 illustrates an operating environment for the wireless communication device of FIG. 1.

FIG. 3 illustrates the operating environment for a wireless communication device 10. Further example wireless communication devices 30, 32 and 34 are also illustrated in FIG. 3. These wireless communication devices 30, 32 and 34 are similar to device 10 and also store and execute virtual machine software.

Virtual machine software like that stored at device 10, executes on each wireless communication device 10, 30, 32, 34, and communicates with a transaction server 44 (referred to as a "middleware server 44" in U.S. Patent Publication No. US 2003/0060896, referenced above) by way of example wireless networks 36 and 38 and network gateways 40 and 42. Example gateways 40 and 42 are generally available as a service for those people wishing to have data access to wireless networks. Wireless networks 36 and 38 are further connected to one or more computer data networks, such as the Internet and/or private data networks by way of gateway 40 or 42. As will be appreciated, embodiments of the invention may work with many types of wireless networks. Transaction server 44 is in turn in communication with a data network, that is in communication with wireless networks 36 and 38. The communication used for such communication is via a HyperText Transfer Protocol (HTTP) transport over Transmission Control Protocol/Internet Protocol (TCP/IP). As could be appreciated, other network protocols such as X.25 or Systems Network Architecture (SNA) could equally be used for this purpose.

At least two categories of communication between transaction server 44 and wireless communication devices 10, 30, 32 and 34 exist. First, virtual machine software 24 at each device may query transaction server 44 for a list of applications that a user of an associated wireless communication device 10, 30, 32 or 34 can make use of. If a user decides to use a particular application, device 10, 30, 32 or 34 can download a text description, in the form of an application definition file, for the application from the transaction server 44 over its wireless interface. Second, virtual machine software 24 may send and receive (as well as present, and locally store) data to and from transaction server 44 which is related to the execution of applications, or its own internal operations. The format of exchanged data for each application is defined by an associated application definition file. Again, the exchanged data may be formatted using XML, in accordance with the application definition file.

Transaction server 44 stores XML application definition files for those applications that have been enabled to work with the various devices 10, 30, 32, and 34 using virtual machine software 24 in a pre-defined format understood by virtual machine software 24. Software providing the functions of the transaction server 44, in the exemplary embodiment is written in C#, using SQL Server or MySQL database.

The XML of the application definition files may conform to XML version 1.0, detailed in the XML version 1.0 specification third edition and available at www.w3.org/TR/2004/REC-xml-20040404, for example.

Each application definition file is formatted according to defined rules and uses pre-determined XML markup tags known by both virtual machine software 24, and complementary transaction server software 68. That is, each application definition file 28 is an XML document (i.e. an XML data instance file) which conforms to a predefined XML schema designed to support the execution of server-side applications at various types of wireless communication devices. Tags define XML elements used as building blocks to present an application at a wireless communication device. Knowledge of these rules, and an understanding of how each tag and section of text should be interpreted, allows virtual machine software 24 to process an XML application definition and thereafter execute an application, as described below. Virtual machine software 24 effectively acts as an interpreter for a given application definition file.

Figure 4:
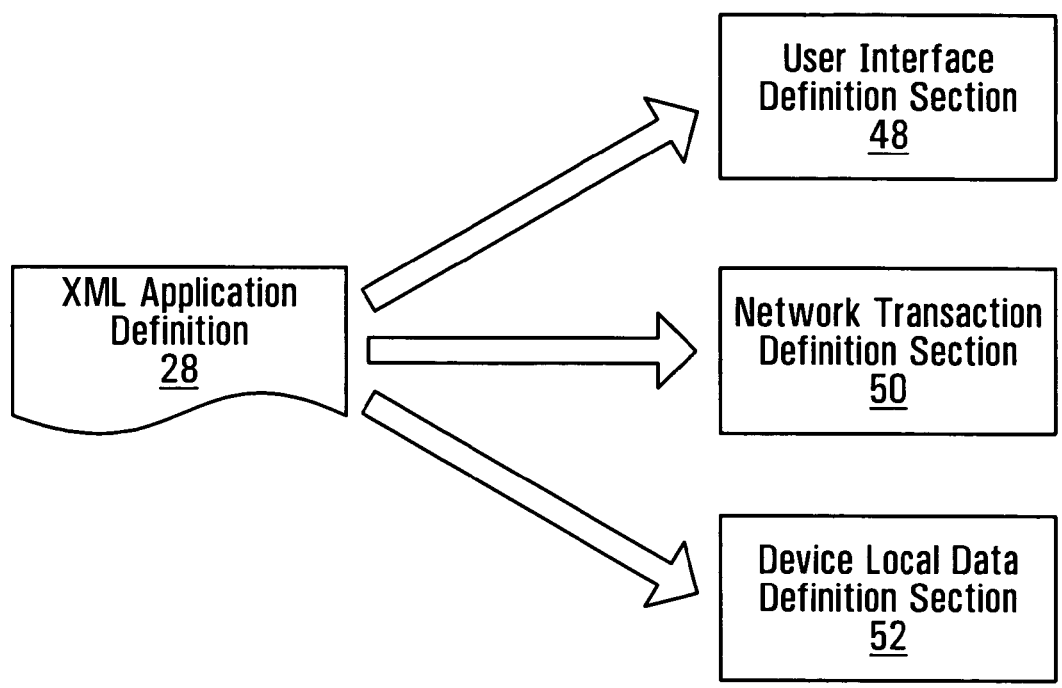
FIG. 4 illustrates the structure of example application definitions used by the device of FIG. 1.

FIG. 4 illustrates an example format for an XML application definition file 28. As illustrated, the example application definition file 28 for a given device and application includes three components: a user interface definition section 48, specific to the user interface for the device 10, which defines the format of graphical user interface (GUI) screens for the application and how the user interacts with them and contains application flow control events and actions; a network transactions definition section 50 defining the format of data to be exchanged with the application; and a local data definition section 52 defining the format of data to be stored locally on the wireless communication device by the application.

Defined XML markup tags are used to create an application definition file 28. The defined tags may broadly be classified into three categories, corresponding to the three sections 48, 50 and 52 of an application definition file 28.

Example XML tags and their corresponding significance are detailed in Appendix "A". As noted above, virtual machine software 24 at a wireless communication device includes object classes corresponding to each of the XML tags. At run time, instances of the objects are created as required.

Broadly, the following list includes example XML tags (i.e. XML elements) which may be used to define the GUI screens:

SCREEN—this defines a screen. A SCREEN tag pair contains the definitions of the user interface elements (buttons, radio buttons, and the like) and the events associated with the screen and its elements BTN—this tag defines a button and its associated attributes LB—this tag defines a list box that allows selection of an item from a list of items.

CHOICE—this tag defines a choice item, that allows selection of an item from a set of items.

MENU—the application developer will use this tag to define a menu for a given screen.

MENUITEM—defines a selectable item on a given menu.

EB—this tag defines an edit box for entering textual content.

TI—this tag describes a text label that is displayed.

CHK—this tag describes a checkbox.

GRID—this tag defines a grid made up of a configurable number of columns and rows defining cells for containing textual content.

EVENT—this defines an event to be processed by the virtual machine software. Events can be defined against the application as a whole, individual screens or individual items on a given screen. Sample events would be receipt of data over the wireless interface, or an edit of text in an edit box by a wireless communication device user.

ACTION—this describes a particular action should be performed upon the occurrence of a particular event. Sample actions would be navigating to a new window or displaying a message box.

The second category of example XML tags describes the network transaction section 50 of application definition 28. These may include the following example XML tags:

TUPDATE—using this tag, the application developer can define an update that is performed to a table in the device's local storage. Attributes allow the update to be performed against multiple rows in a given table at once.

PKGFIELD—this tag is used to define a field in a data package (message) that passes over the wireless interface.

The third category of XML tags used to describe an application are those used to define a logical database that may be stored at the wireless communication device. The tags available that may be used in this section are:

TDE—this tag, and its attributes and subordinate field tags, define a table. Contained within a pair of TDEF tags are definitions of the fields contained in that table. The attributes of a table control such standard relational database functions as the primary key for the table.

FLD—this tag describes a field and its attributes. Attributes of a field are those found in a standard relational database system, such as the data type, whether the field relates to one in a different table, the need to index the field, and so on.

In addition to these XML tags, virtual machine software 24 may, from time to time, need to perform certain administrative functions on behalf of a user. In order to do this, one of object classes 69 has its own repertoire of tags to intercommunicate with the transaction server 44. Such tags differ from the previous three groupings in that they do not form part of an application definition file, but are solely used for administrative communications between the virtual machine software 24 and the transaction server 44. Data packages using these tags are composed and sent due to user interactions with the virtual machine's configuration screens. The tags used for this include:

REG—this allows the application to register and deregister a user for use with the transaction server.

FINDAPPS—by using this operation, users can interrogate the server for the list of applications that are available to them.

APPREG—using this operation, the end-user can register (or deregister) for an application and have the application interface downloaded automatically to their device (or remove the interface description from the device's local storage).

SA—If the user's preferred device is malfunctioning, or out of power or coverage, they will need a mechanism to tell the Server to attempt delivery to a different device. The Set Active (SA) command allows the user to set the device that they are currently using as their active one.

Figure 5:
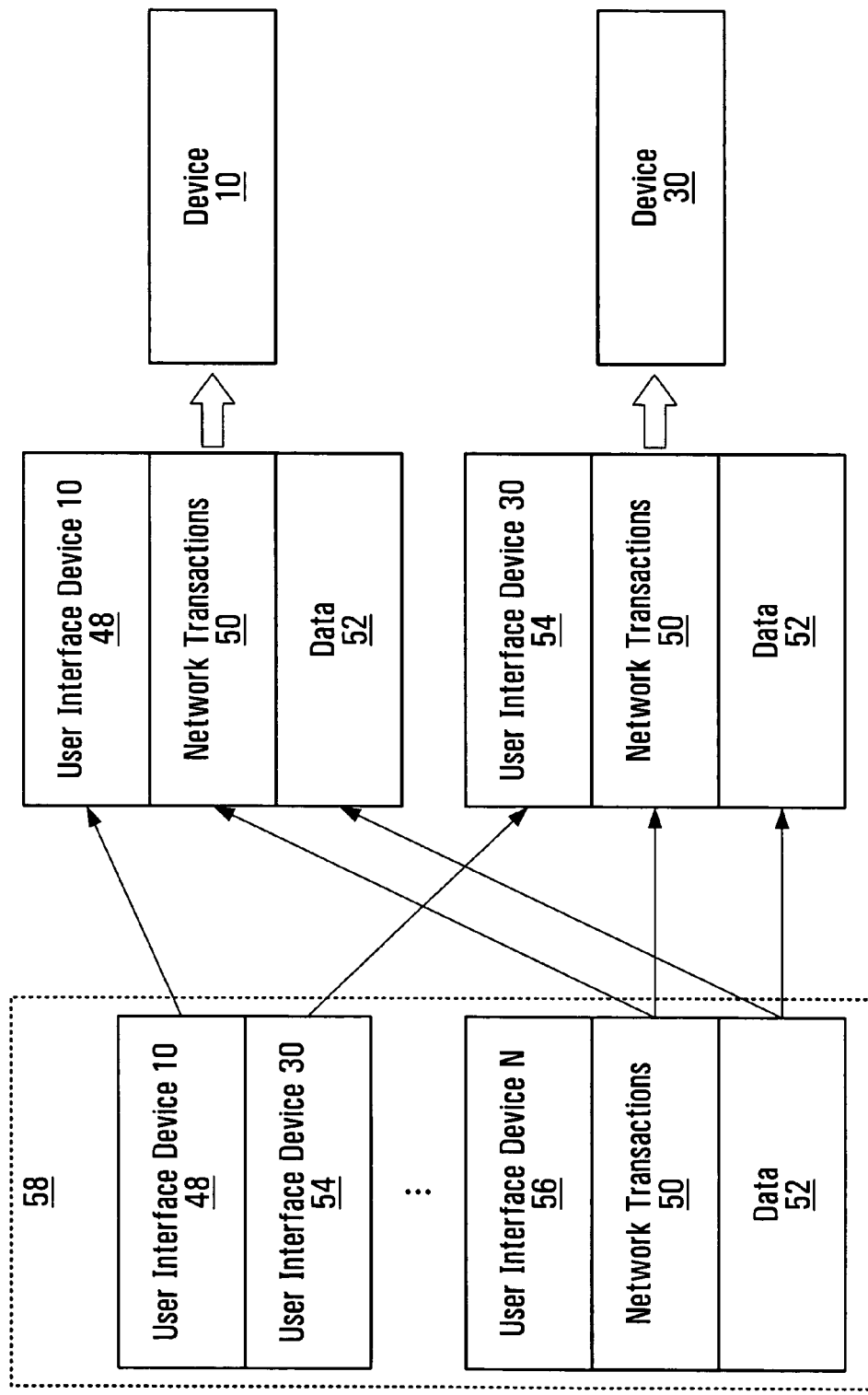
FIG. 5 schematically illustrates the formation of application definition files at a transaction server of FIG. 3 from a master definition file.

Referring again generally to the manner in which execution of server-based applications at wireless communication devices is facilitated, FIG. 5 illustrates the organization of application definitions at transaction server 44 and how transaction server 44 may form an application definition file 28 (FIG. 4) for a given device 10, 30, 32 or 34. In the illustration of FIG. 5, only two wireless communication devices 10 and 30 are considered. Typically, since network transactions and local data are the same across devices, the only piece of the application definition that varies for different devices is the user interface definition (i.e. the definition of its GUI screens).

So, transaction server 44 stores a master definition file 58 (or simply "master definition" 58) for a given server-side application. This master definition 58 contains example user interface descriptions 48, 54, 56 for each possible type of wireless communication device 10, 30, 32; descriptions of the network transactions 50 that are possible and data descriptions 52 of the data to be stored locally on the wireless communication device. Typically the network transactions 50 and data descriptions 52 will be the same for all wireless communication devices 10, 30 and 32, while the user interface descriptions 48, 54, and 56 vary slightly from one another. This may for example be due to display size limitations on some wireless communication devices which force a designer to lay out the display elements of a user interface slightly differently from device to device.

For device 10, transaction server 44 composes an application definition file 28 by querying the device type and adding an appropriate user interface description 48 for device 10 to the definitions for the network transactions 50 and the data 52. For device 30, transaction server 44 composes the application definition file 28 by adding the user interface description 54 for device 30 to the definitions for the network transactions 50 and data 52. These two files 28 may be thought of as platform-specific versions of a mobile application.

The master definition 58 for a given application is created away from the transaction server 44 and may be loaded onto the transaction server 44 by administrative staff charged with its operation. Master definition files may be created by a developer using a rapid application development tool such the one that is described below in Section II. Alternatively, a simple text editor could be used. It will be appreciated that the master definition file 58 is an XML document.

Figure 6:
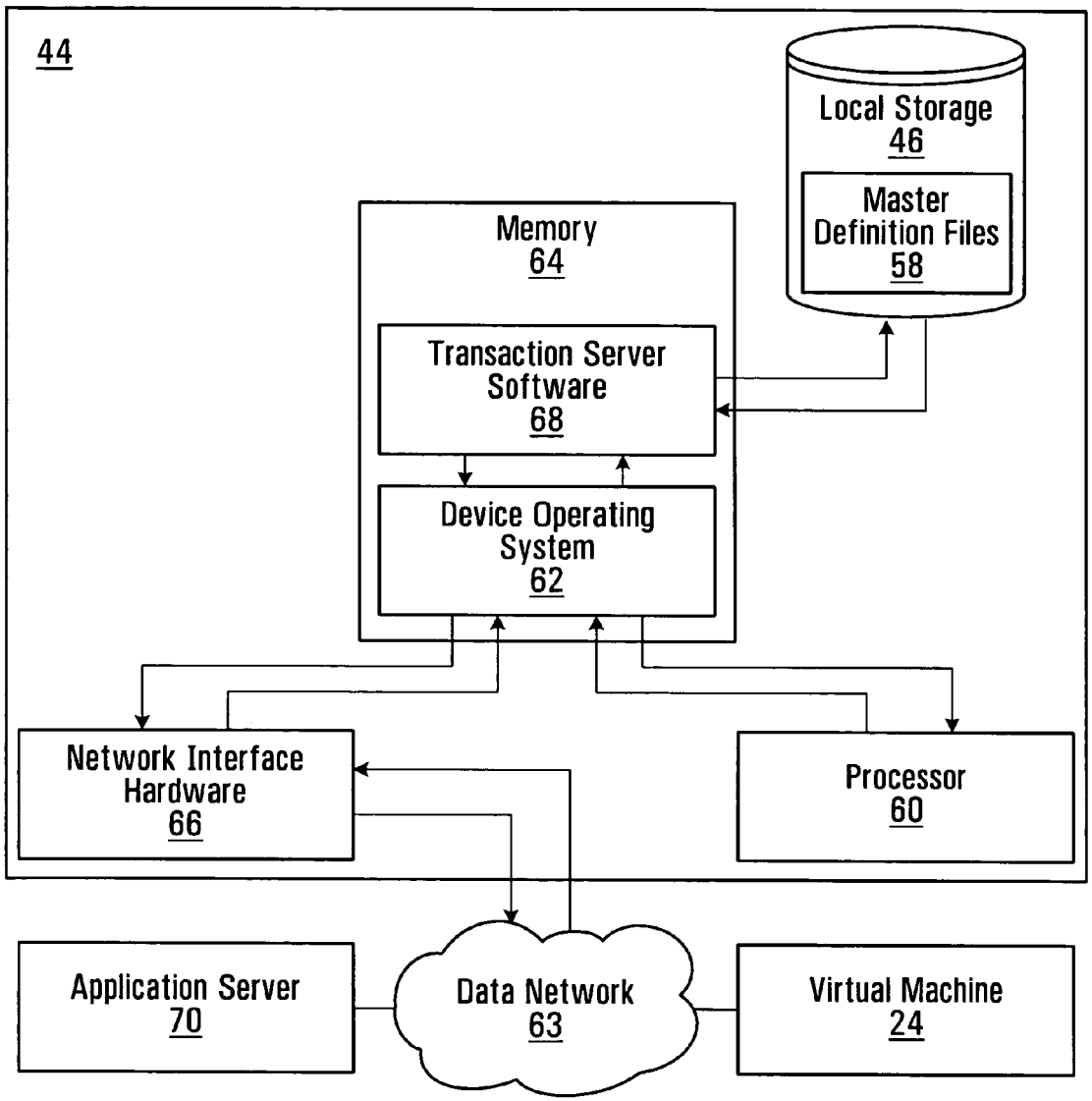
FIG. 6 schematically illustrates the transaction server of FIG. 3 in greater detail.

FIG. 6 illustrates the organization of transaction server 44. Transaction server 44 may be any conventional application server, modified to function in as described herein. As such, transaction server 44 includes a processor 60, in communication with a network interface 66 and storage memory 64. Transaction server 44 may be, for example, a server running Windows Server 2003, a Sun Solaris server, or the like. Memory of transaction server 44 stores an operating system such as Windows Server 2003, or Solaris operating system software 62.

Network interface 66 enables transaction server 44 to transmit and receive data over a data network 63. Transmissions are used to communicate with both the virtual machine software 24 (via the wireless networks 36, 38 and wireless gateways 40, 42 of FIG. 3) and one or more application servers, such as application server 70, that are the end recipients of data sent from the mobile client applications and the generators of data that is sent to the mobile client applications.

Memory at transaction server 44 further stores software 68 which, when executed by transaction server 44, enables the transaction server to understand and compose XML data packages that are sent and received by the transaction server 44. These packages may be exchanged between transaction server 44 and the virtual machine software 24, or between the transaction server 44 and the application server 70. Transaction server software 68 may be loaded from a machine-readable medium.

As described above, communication between the application server 70 and the transaction server 44 can, in an exemplary embodiment, use HTTP running on top of a standard TCP/IP stack; however this is not a requirement. An HTTP connection between a running application at the application server 70 and the transaction server 44 is established in response to the application at a wireless communication device presenting the application. The server-side application provides output to transaction server 44 over this connection. The server-side application data is formatted into appropriate XML data packages understood by the virtual machine software 24 at a wireless communication device by the server-side application.

That is, a server-side application (or an interface portion of the application) formats application output into XML in a manner consistent with the format defined by the application definition file for the application. Alternatively, an interface component separate from the application could easily be formed with an understanding of the format and output for a particular application. That is, with a knowledge of the format of data provided and expected by an application at application server 70, an interface component could be produced using techniques readily understood by those of ordinary skill. The interface portion could translate application output to XML, as expected by transaction server 44. Similarly, the interface portion may translate XML input from a wireless communication device into a format understood by the server-side application.

The particular identity of the wireless communication device on which the application is to be presented may be identified by a suitable identifier, in the form of a header contained in the server-side application output. This header may be used by transaction server 44 to forward the data to the appropriate wireless communication device. Alternatively, the identity of the connection could be used to forward the data to the appropriate wireless communication device.

Figure 7:
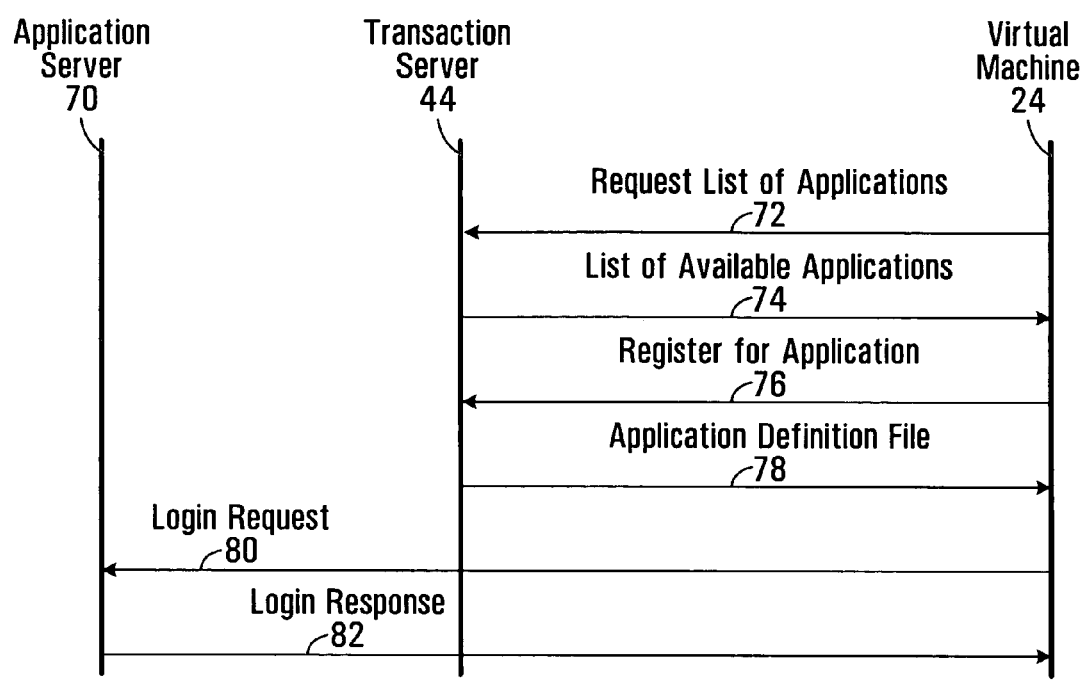
FIG. 7 is a flow diagram illustrating the exchange of sample messages passed between a wireless communication device, transaction server and application server.

FIG. 7 illustrates a sequence diagram detailing data (application data or application definition files 28) flow between wireless communication device 10 and transaction server 44.

For data requested from transaction server 44, device 10, executing virtual machine software 24, makes a request to transaction server 44, which passes over the wireless network 36 through network gateway 40. Network gateway 40 passes the request to the transaction server 44. Transaction server 44 responds by executing a database query on its database 46 that finds which applications are available to the user and the user's wireless communication device. For data passed from transaction server 44 to device 10, data is routed through network gateway 40. Network gateway 40 forwards the information to the user's wireless communication device over the wireless network 36.

FIG. 7 when considered with FIG. 3 illustrates a sequence of communications between virtual machine software 24 (executing at device 10) and transaction server 44 that may occur when the user of a wireless communication device wishes to download an application definition file 28 for a server-side application.

Initially device 10 may interrogate server 44 to determine which applications are available for the particular wireless communication device being used. This may be accomplished by the user instructing the virtual machine software 24 at device 10 to interrogate the server 44. Responsive to these instructions the virtual machine software 24 sends an XML message to the server requesting the list of applications (data flow 72); the XML message may contain the <FIND-APPS> tag, signifying to the transaction server 44, its desire for a list of available applications. In response, transaction server 44 makes a query to database 46. Database 46, responsive to this query, returns a list of applications that are available to the user and the wireless communication device. The list is typically based, at least in part, on the type of wireless communication device making the request, and the applications known to transaction server 44. Transaction server 44 converts this list to an XML message and sends it to the virtual machine (data flow 74). Again, a suitable XML tag identifies the message as containing the list of available applications.

In response, a user at device 10 may choose to register for an available server-side application. When a user chooses to register for an application, virtual machine software 24 at device 10 composes and sends an XML registration request for a selected application (data flow 76) to transaction server 44. As illustrated in FIG. 7, an XML message containing a <REG> tag is sent to transaction server 44. The name of the application is specified in the message. The transaction server 44, in response, queries its database for the user interface definition for the selected application for the user's wireless communication device. Thereafter, the transaction server creates the application definition file, as detailed with reference to FIG. 5. Then, transaction server 44 sends to the wireless communication device (data flow 78—FIG. 7) the created application definition file 28.

The user is then able to use the functionality defined by the interface description to send and receive data.

At this time, parser 61 of virtual machine software 24 may parse the XML text of the application definition file to form a tokenized version of the file. That is, each XML tag may be converted to a defined token for compact storage and to minimize repeated parsing of the XML text file. The tokenized version of the application definition file may be stored for immediate or later use by device 10. In this context, the term "tokenized" may refer to placement of the XML structure into binary objects which are run-time accessible, which is much like conversion of a script into byte code.

The application definition file may initially be converted to a DOM tree representation. The entire DOM tree may then be traversed. For each XML element that is encountered during the traversal, a corresponding object 169 (FIG. 2B) may be instantiated from one of object classes 69. Instantiation of each object 169 may be facilitated by a fromXML( ) "constructor" method within the corresponding class 69, which populates the object's data members based on XML element/attribute values. For example, the constructor method may receive the XML fragment which defines the XML element in the application definition file 28 and, based on the element and attribute values within the fragment, automatically populate the newly instantiated object's data members with like values. It is noted that the constructor method may or may not meet the strict definition of the term "constructor" as it is understood in the context of certain object-oriented programming languages (e.g. the method may not have the same name as the class).

For purposes of illustrating the instantiation of a subset of the objects 169 of FIG. 2B, it is assumed that the following XML fragment is read from an application definition file 28:

```
<BTN NAME="BTN1" INDEX="1" CAPTION="OK">
    <EVENTS>
        <EVENT TYPE="ONCLICK"...>
            <ACTION...>
            <ACTION...>
        </EVENT>
    </EVENTS>
```

The above XML fragment represents an "OK" button on a containing GUI screen (not shown) which performs two actions when clicked. The details of the actions are omitted for brevity. When a DOM tree representation of the above is encountered, the result may be instantiation of the button object 173 (FIG. 2B) from the following one of classes 69:

```
Public class button
{
str name;
int index;
str caption;
event[ ] events;   // event array
fromXML(<XML>) { ... } // "constructor"
writeToPersistantStorage( ) { ... }
readFromPersistantStorage( ) { ... }
onEvent( ) { ... }
    :
}
```

The data members "name", "index" and "caption" of object 173 correspond to attributes of the same name within the XML fragment. The constructor method fromXML( ) populates these data members with the values "BTN1", "1" and "OK", respectively, based on the relevant XML attribute values.

The constructor method also populates the event array of button object 173. The event array is an array of event objects, each representing a different type of event that is significant with regard to the containing GUI screen display element (in this case, button object 173). In the above example, only one significant event is defined for the "OK" button, namely, an "ONCLICK" event which represents the clicking of the button. Accordingly, only one event object 175 is instantiated. The event object's data members includes an array of action objects 177 and 179 (one for each action element in the above XML fragment) representing actions to be taken when the event occurs. Each action object is also populated by a constructor method within the action object, in like fashion.

The result of instantiating the button object and subordinate objects is illustrated in FIG. 2B. The button object is shown at 173, within the context of objects 169. In FIG. 2B, illustration of an object within the border of another object connotes the latter object's containment of the former. In the present embodiment a contained object is a data member of the containing object.

The button object 173 is contained within a screen object 171 which also includes an edit box object 181. This hierarchy indicates a UI screen having both a button and an edit box. The sole significant event for the button object 173 is represented by event object 175, which is the sole member of the event array of button object 173. The event object 175 in turn contain action objects 177 and 179 which represent actions that are to be taken when the containing event occurs. The actions may be of various types, as will be described.

The remaining objects 169 of FIG. 2B are based on other portions of the application definition file 28 which are not expressly set forth above. Briefly, the edit box object 181 of FIG. 2B contains two events 183 and 191, each representing a significant event for the edit box (say, selection and text entry). These event objects in turn contain actions 185, 193 and 195, representing actions to be taken when the relevant event occurs.

The button class contains an onEvent( ) method. This method is invoked via a callback from the operating system 20 upon the detection of any event pertaining to the button UI construct for purposes of determining whether the detected event is significant and thus requires action to be taken. Other UI constructs, such as edit boxes, menu items, and the like also have a similar method. Cumulatively, these methods within instantiated objects 169 may comprise event handler 65 of FIG. 2A.

Each class also includes a writeToPersistentStorage( ) method which saves the object's state by storing data member values, e.g. to a file system. The values are typically stored in a binary representation. This method is invoked during initial DOM tree traversal for purposes of writing to persistent storage newly instantiated objects which are not immediately needed. Once the data has been so stored, the objects may be de-allocated, and as a result, it is not necessary to maintain a vast set of objects representative of the entire application definition file 28 within wireless communication device memory. Only objects 169 pertaining to the current wireless communication device application state are instantiated at any given time, and wireless communication device resources are thereby conserved. A corresponding readFromPersistentStorage( ) method permits a newly instantiated object to assume the state of a previously de-allocated object from values saved to persistent storage by the writeToPersistentStorage( ) method, e.g., when a screen is loaded due to user navigation to that screen. By initially storing the entire set of objects to persistent storage in this fashion, the need to maintain a DOM tree is avoided.

Thereafter, upon invocation of a particular application for which the device 10 has registered, the screen generation engine 67 of the virtual machine software 24 at the device causes the virtual device to locate the definition of an initial screen for that application. The initially loaded screen will be the one identified within the application definition file 28 for that application by way of the attribute <First screen="yes">.

Figure 8:
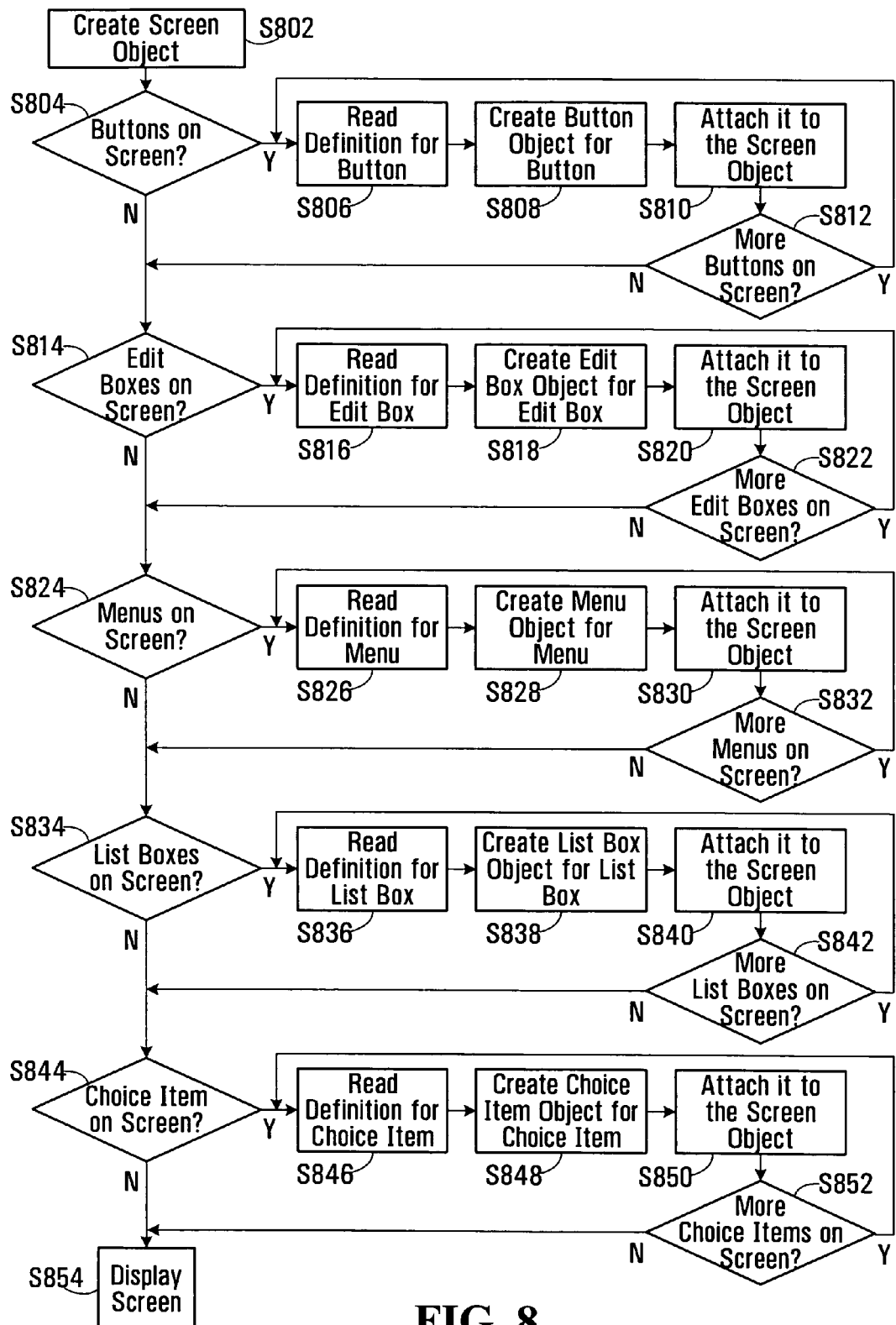
FIGS. 8-10 illustrate operation performed at a wireless communication device under control of virtual machine software of FIGS. 2A and 2B.

Operation for loading a first or subsequent screen is illustrated in FIG. 8. To load a screen, generation engine 67 may employ a loadScreen(X) routine, which may be one of the general purpose routines 59 within virtual machine software 24 (FIG. 2B). This routine may accept as a parameter a unique screen identifier X. Based on that identifier, the routine may find the appropriate representation of the named screen within local storage 26 (as previously stored by the writeToPersistentStorage( ) method of that screen when the DOM tree was initially traversed), instantiate a new screen object 169 (S802), and cause the new screen object to populate itself with the stored data, e.g. through invocation of the readFromPersistentStorage( ) method of the screen object. The latter method may in turn instantiate subordinate objects (such as buttons, edit boxes, menus, list boxes, choice items, and checkboxes, as detailed in Appendix "A") and cause the readFromPersistentStorage( ) methods of these subordinate objects to be called, in an iterative fashion. In the result, a hierarchy of instances 169 of object classes 69 are created within the virtual machine software 24, as illustrated in FIG. 2B.

Figure 9:
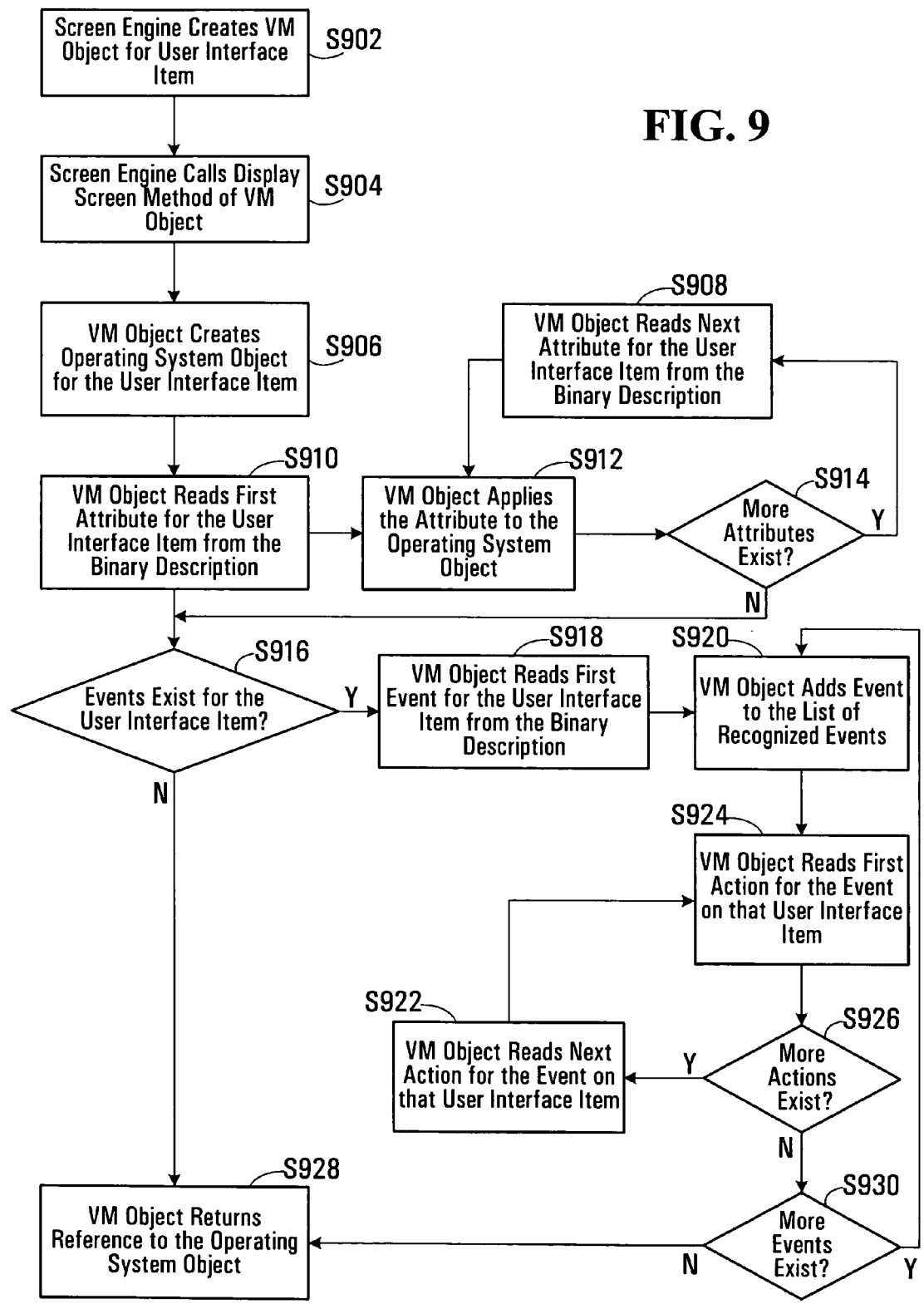

Each definition of a visual UI construct (also referred to as a "display element") causes virtual machine software 24 to use the operating system of the wireless communication device to create corresponding display element of a graphical user interface as more particularly illustrated in FIG. 8. Specifically, for each element (S804, S814, S824, S834 and S844), the associated XML definition is read in (S806, S816, S826, S836 and S846) and a corresponding instance of a screen object defined as part of the virtual machine software 24 is created by the virtual machine software 24 (at S808, S818, S828, S838 and S848), in accordance with S902 and onward illustrated in FIG. 9. Each interface object instance is created at S902. Each instance takes as attribute values defined by the XML text associated with the element. A method of the virtual machine object is further called (S904), and causes a corresponding device operating system object to be created (S906). Attributes originally defined in the XML text file, as stored within the virtual machine object instance, are applied to the corresponding instance of a display object created using the device operating system (S908-S914). This is repeated for all attributes of the virtual machine object instance. For any element allowing user interaction, giving rise to an operating system event, the event handler 65 of virtual machine software 24 is registered to process operating system events. This may for example entail registering, for each display element on the screen (e.g. buttons, menu items, etc.), a callback to an onevent( ) method of the UI construct, which will be invoked upon the occurrence of any event in respect of that construct for purposes of determining whether the event is significant, such that the event's actions should be executed as a result. The onevent( ) methods for all of the objects which are associated with the currently displayed screen may constitute the event handler 65 for that screen. That is, there may be no distinct instance of an event handler 65 per se other than the onEvent( ) methods of currently displayed or instantiated UI construct objects.

As described above and illustrated in FIG. 2B, for each event (as identified by an <EVENT> tag in the application definition file 28) and action (as identified by an <ACTION> tag), virtual machine software 24 creates an instance of a corresponding event and action object forming part of virtual machine software 24. Virtual machine software 24 maintains a list identifying each instance of each event and action object, which may take the form of arrays of event objects and subordinate arrays of action objects as described above (S916 to S928).

Operation at S902-S930 is repeated for each element of the screen at S808, S818, S828, S838 and S848 as illustrated in FIG. 8. All elements originally defined between the <SCREEN> definition tags of the application definition file are so processed. After the entire screen has been so created in memory, it is displayed (S854), using conventional techniques.

Figure 10:
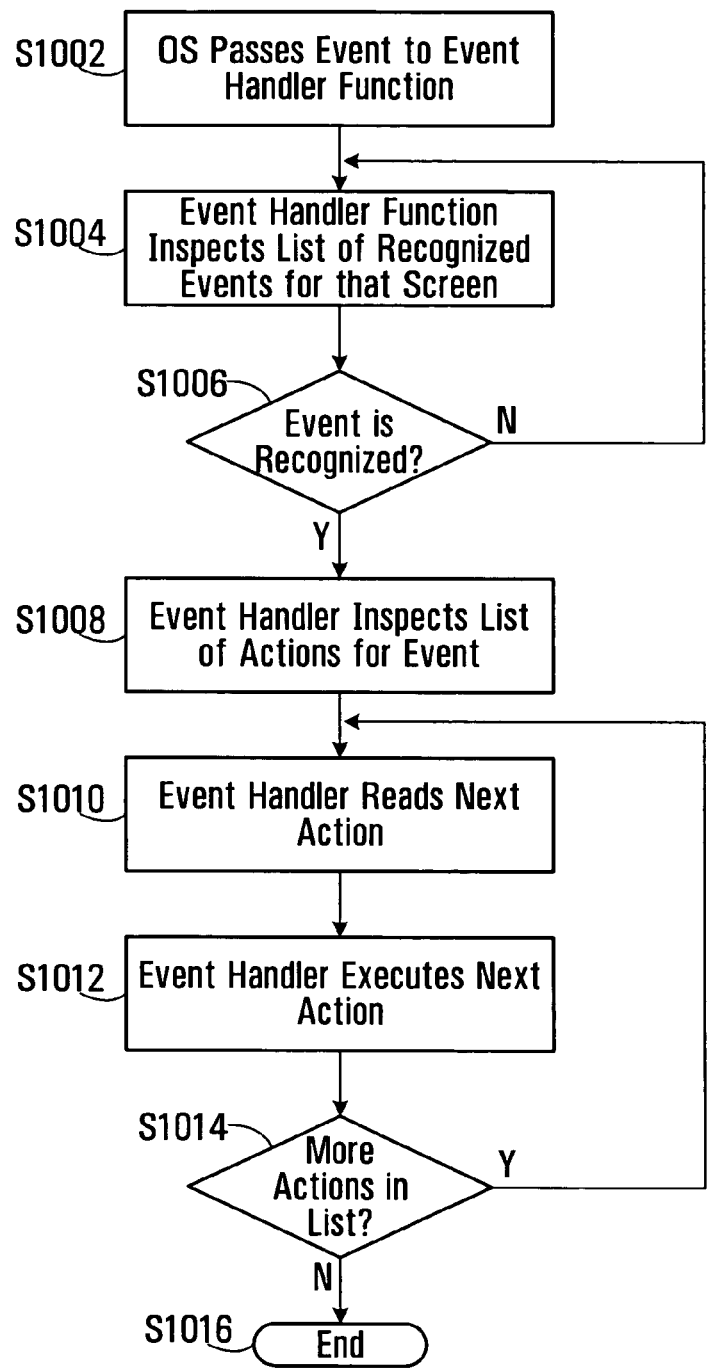

Events may be handled by virtual machine software 24 as illustrated in FIG. 10. Operation at S1002 and onward is performed in response to the operating system detecting an event.

Upon the occurrence of an event, such as the receipt of data from a wireless network 36 or 38 or user interaction with user interface controls at the wireless communication device, the operating system automatically invokes the onevent( ) method for each object 169 in respect of which callback was earlier registered (S1002). The onEvent( ) method for these objects determines whether the event is significant for the object (S1004) and, if so (S1006), passes control to each of the action(s) in the array of action objects within the relevant event object, in succession (S1008-S1016), for purposes of effecting the desired behaviour. Control may for example be passed by invoking a doAction( ) method of each instance of an action object within the action object array that comprises the data members of the relevant event object, in order to effect desired processing as defined by the XML <ACTION> tag. The result of executing this method may be loading a named screen, closing the current screen, sending a message, storage data locally at the device, or other actions, as described below. Within the doAction( ) method of each action object, hard-coded instructions exist that are capable of causing various types of actions to be performed. The attribute values within the action object's data members dictate which of these hard-coded instructions are executed and thereby effectively serve as parameters to the action which determine the resultant operation of the wireless communication device.

In some cases, the doAction( ) method may invoke a general purpose routine. For example, if an action specifies that a screen should be closed, a "destroy screen X" routine 181, which is one of general purpose routines 59 (FIG. 2B) in the present embodiment, may be invoked from the action object's doAction( ) method. This routine may traverse screen objects within the instantiated objects 169 until the screen with the specified name X is found, at which point that screen object may be instructed to destroy itself. If the action indicates that a message (package) should be sent, a "createXMLPackage( )" general purpose routine 187 (FIG. 2B) may be invoked from the action object's doAction( ) method, to create and send a message over wireless network 22 containing specified data. According to that routine 187, methods within an XML builder object may assemble data into an XML package which is then passed to message server object. The message server object may use the device's network APIs to transmit the assembled XML package across the wireless network.

By executing actions which cause new screens to be loaded or closed, navigation through the screens of the application is accomplished according to the definition embodied in the application definition file 28.

If the event is the receipt of an XML package from the wireless network 22, then the relevant event objects will not be directly contained within a UI construct object within objects 169 (as shown in FIG. 2B). Rather, the relevant event objects will be defined at the application level or at the screen level, depending upon whether the data event is defined as an application-level event (i.e. significant regardless of the currently displayed screen) or a screen-level event (i.e. only significant when a particular screen is displayed), respectively. When an XML package is received, the event objects whose onevent( ) methods are invoked will be at the same level as, or will be directly contained by, the screen object corresponding to the currently displayed screen (FIG. 2B).

So, for example, as illustrated in FIG. 7, a user could send a login request 80 by interacting with an initial login screen, defined in the application definition file for the application. This would be passed by the transaction server 44 to the backend application server 70. The backend application server according to the logic embedded within its application, would return a login response 82, which the transaction server 44 would pass to the virtual machine software 24. Other applications, running on the same or other application servers might involve different interactions, the nature of such interactions being based upon the functionality and logic embedded within the application server 70.

II. Rapid Application Development Tool

Figure 11:
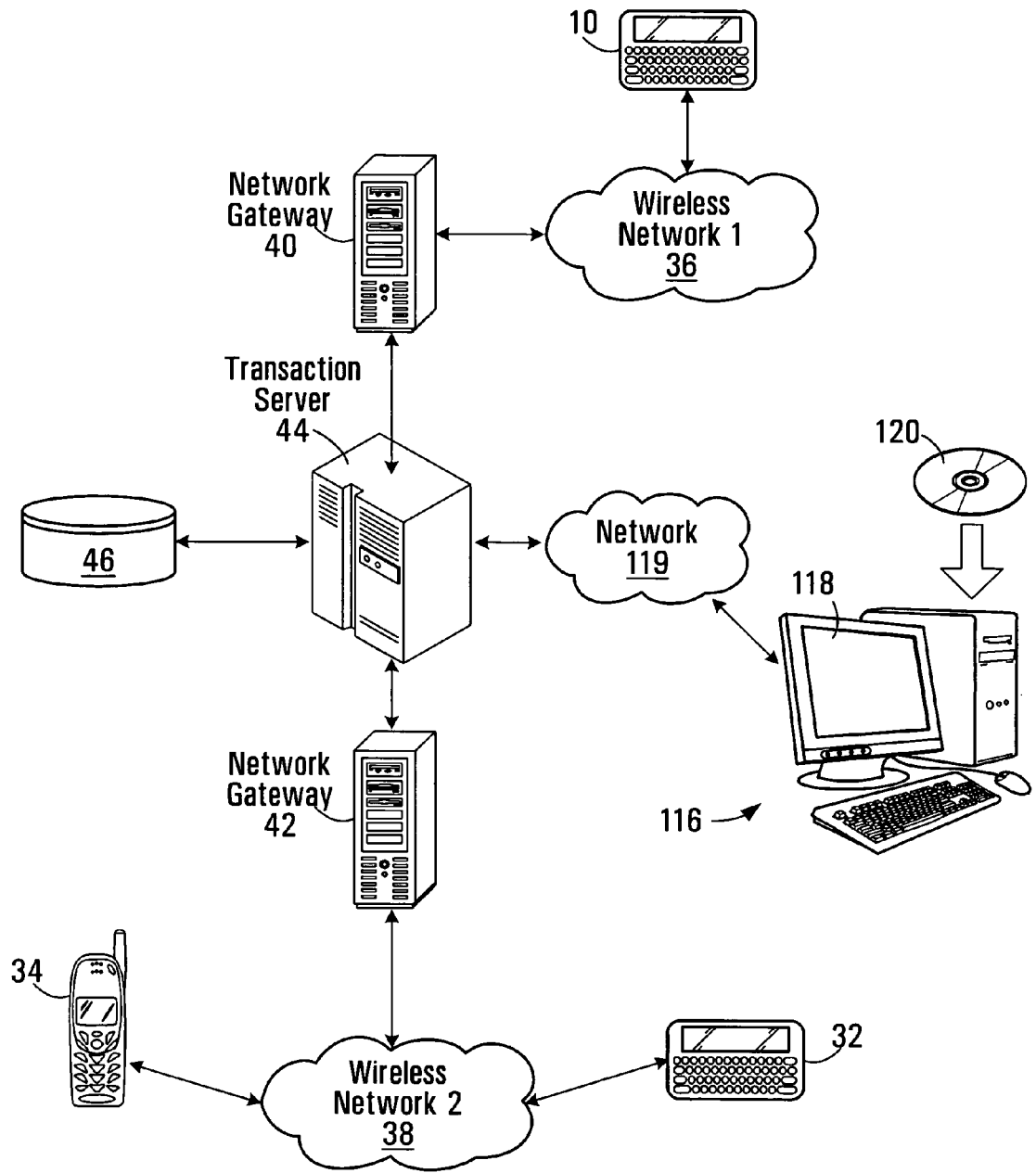
FIG. 11 schematically illustrates the wireless communication device operating environment of FIG. 3 with an exemplary Rapid Application Development (RAD) tool which may be used to develop master definition files in a manner exemplary of an embodiment of the present invention.

In order to facilitate the development of a master definition file 58 (and, indirectly, application definition files 28) for use in the system described above, a rapid application development tool may be used. An exemplary RAD tool 116 (or simply "tool 116") is illustrated in FIG. 11. FIG. 11 illustrates the tool 116 within the wireless communication device operating environment of FIG. 3. Wireless communication device 30 of FIG. 3 is omitted from FIG. 1 for clarity.

The RAD tool 116 of FIG. 11 is a computing device 118, such as an Intel®-Processor based personal computer (PC) for example, executing rapid application development (RAD) software, which may be loaded from a machine-readable medium such as an optical disk 120. The tool 116 allows the developer to create a master application definition file 58 from which device-specific application definition files 28 may be generated. Completed master definition files 58 are uploaded from computing device 118 to transaction server 44, via network 119, which may be an Ethernet local area network for example, for downloading to wireless communication devices 10, 32 and 34. In turn, the device-specific application definition file 28, when downloaded, interpreted and executed at a wireless communication device 10, 32 or 34, permits the wireless communication device to emulate and intercommunicate with an application that is actually executing on an application server 70 (FIG. 6), as described above.

Figure 12:
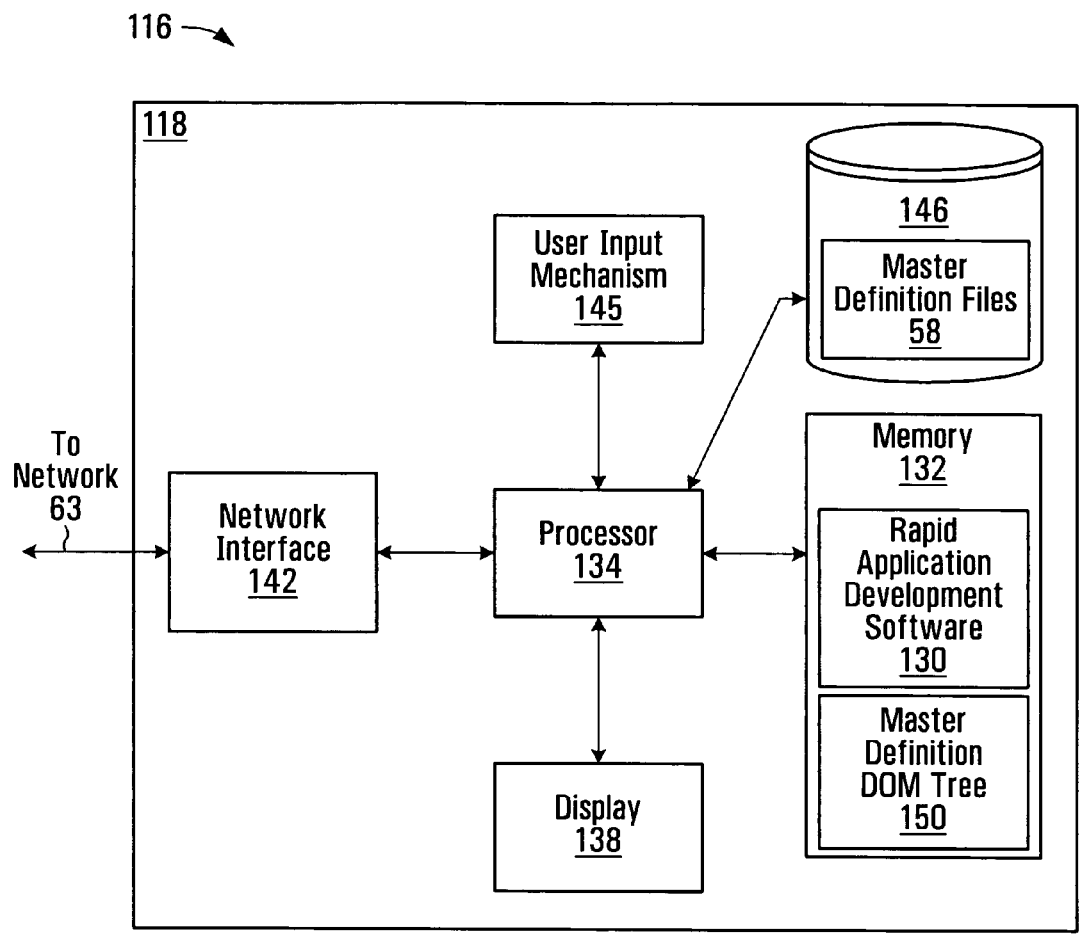
FIG. 12 schematically illustrates the RAD tool of FIG. 11 in greater detail.

FIG. 12 illustrates RAD tool 116 in greater detail. In the present embodiment the tool 116 is a PC 118 executing RAD software 130. The PC 118 includes a processor 134 in communication with memory 132 which stores the software 130. The PC 118 further includes a conventional display 138, such as a Cathode Ray Tube (CRT) monitor or flat-screen display for example, and a conventional user input mechanism (UIM) 145, such as a keyboard and/or mouse for example. The PC 118 also includes a network interface card 142 (e.g. an Ethernet interface) which facilitates communication by the tool 116 over network 119 (FIG. 11), e.g. for purposes of uploading a completed master definition file 58 from secondary storage 146 to the transaction server 44.

In overview, when RAD software 130 is executed by PC 118, it provides an intuitive graphical user interface which facilitates "drag and drop" application development, so that even developers who lack depth of expertise in software development may "develop a mobile application" (i.e. may generate a master definition file 58). The procedure for developing a mobile application essentially consists of creating a visual hierarchy or "tree" of icons which correlates to a logical hierarchy of XML markup tags (e.g. as defined in Appendix "A"). The created visual hierarchy may be similar to a graphical directory and file structure representation in a conventional graphical operating system. Each icon represents a building block of the application (e.g. a GUI screen, a database table for storing program data, action to be executed upon the occurrence of a defined event etc.) and corresponds to a defined ARML tag (i.e. an instance of an XML element with attributes). As a user creates icons and assigns properties to them, the tool 116 automatically generates a dynamically-accessible representation of the corresponding hierarchy of XML elements and attributes within memory 132, in the form of a master definition DOM tree 150 data structure. A DOM tree is essentially a dynamically accessible representation of an XML document that is well understood in the art. Within this master definition DOM tree 150, a technique is employed to efficiently represent sets of actions that may be triggered in more than one scenario. This technique is a focus of the present description, and is detailed below. When the user of tool 116 has completed development of the mobile application, the application is "published", i.e. the master definition DOM tree 150 is serialized to form a master definition file 58, in a manner exemplary of the present invention.

The RAD software 130, which may be referred to by the proprietary name "AIRIX Design Studio" or simply "Design Studio", may be implemented as a set of plug-ins to a generic integrated design environment (IDE) framework such as the Eclipse framework. As is known in the art, the Eclipse platform is designed for building integrated development environments that can be used to create various applications such as web sites, embedded Java™ programs, C++ programs, and Enterprise JavaBeans™ for example. The platform exposes to tool providers mechanisms to use and rules to follow via well-defined APIs, classes and methods. The RAD software 130 may be written in Delphi, using an SQL Server database for example.

Figure 13:
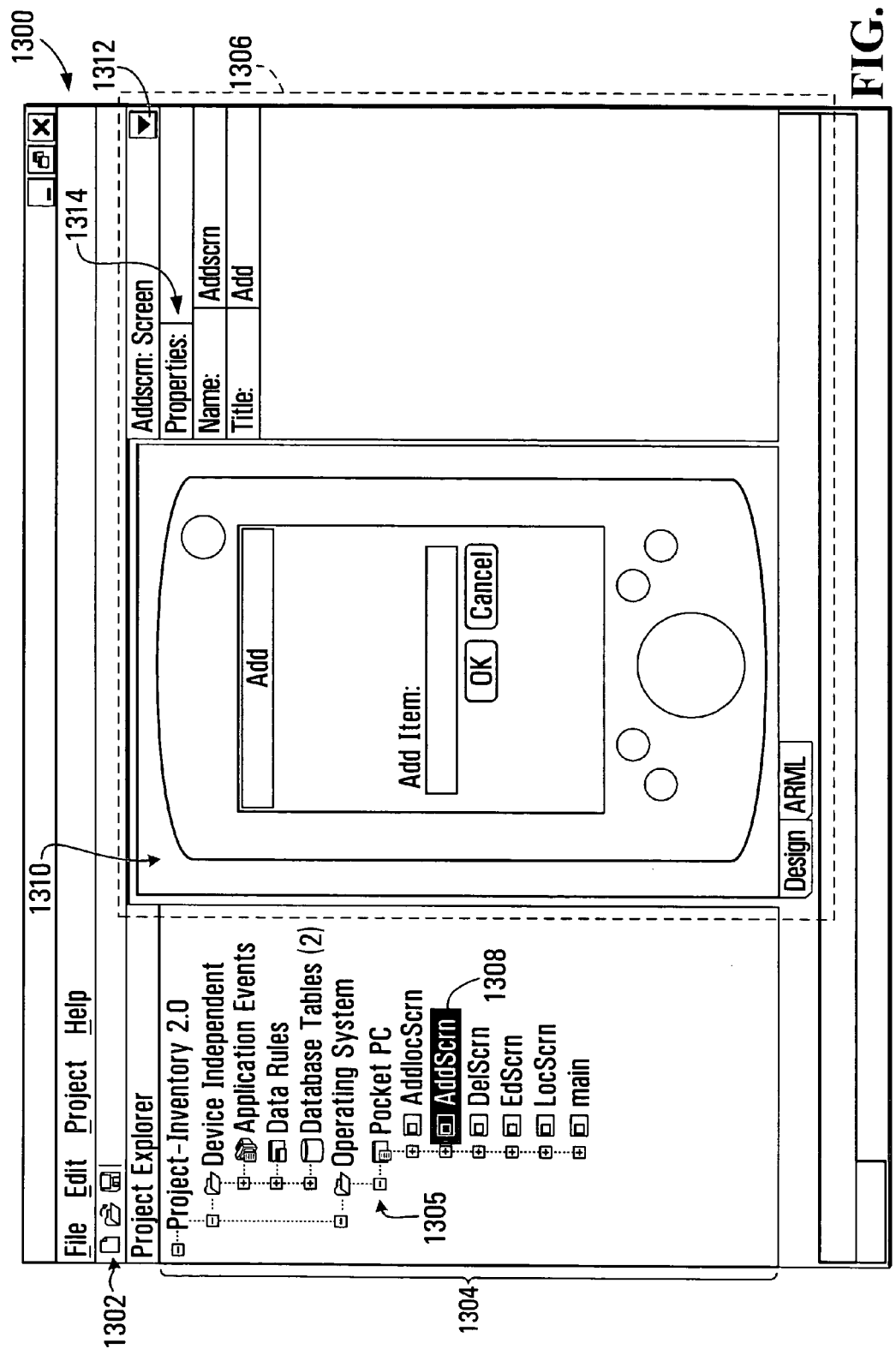
FIG. 13 illustrates an exemplary graphical user interface (GUI) of the RAD tool of FIG. 12.

FIG. 13 illustrates an exemplary GUI 1300 of the RAD tool 116 when the RAD software 130 is executed. The GUI 1300 includes various components, including a toolbar 1302, a project explorer 1304, and a main design area 1306.

Toolbar 1302 includes a menu list and icons for performing various development activities during mobile application development. Activities which may be performed include opening a new project, compiling a current mobile application, and publishing a current mobile application. The term "project" refers to the mobile application under development. Compiling refers to the checking of various aspects of an application for errors or deviations from good programming practices. Compilation may cause hints, warnings or errors to be displayed, e.g.:

Hint—screen "AddS cm" for device "RIM" has an IF action and has no actions for its ELSE LIST.

Warning—Value "[SP.screenname.savename]" is used in the action "gotomm" on screen "AddScm" for device "RIM". It should be noted that if this scratchpad (a temporary buffer on the wireless communication device capable of storing variables under a name "savename" on a screen-specific basis) or query value results to null, the OPEN command will not open a screen.

Error—The action "NewAction" on MenuItem "addloc" on screen "AddScm" for device "RIM" cannot have a blank screen.

Publishing refers to the creation of a master definition file 58 by serializing the master definition DOM tree 150. Publishing may cause hints, warnings or errors to be displayed, as during compilation.

The project explorer 1304 contains the visual hierarchy of icons 1305 that is created by the developer to represent the mobile application. In FIG. 13, the visual hierarchy 1305 defines a simple inventory application for a Pocket PC mobile device. A more detailed view of the project explorer 1304 is provided in FIG. 14, which is described below.

Main design area 1306 of FIG. 13 displays the currently-selected application component of project explorer 1304. When an icon is selected in the visual hierarchy 1305, a graphical representation of the relevant component (e.g. a screen or database table) and its properties appears in main design area 1306. For example, in FIG. 13 icon 1308 representing a Pocket PC GUI screen has been selected, as indicated by reverse video. As a result, an "interface designer" GUI that is specific to the relevant platform appears in design area 1306. The Pocket PC interface designer GUI includes a number of GUI areas, namely, a screen designer 1310, an interface component drop down list 1312 and a properties tab 1314.

The screen designer 1310 is a "screen painter" window which displays a graphical representation of the relevant wireless communication device type (a "virtual device") for which screens are to be created. The designer 1310 permits a developer to design screens by dragging and dropping display elements (such as buttons, edit boxes, or other widgets) to the virtual device screen in the window, offering a "what you see is what you get" (WYSIWYG) view of the interface screen under development.

The interface component drop down list 1312 facilitates definition and selection of individual GUI display elements which make up the screen as displayed within the interface designer window 1310.

The properties tab 1314 displays the properties of the interface component that is currently selected in the drop down list 1312. Properties that are generally applicable to the overall screen may also be displayed. Displayed properties may be updated as desired.

Figure 14:
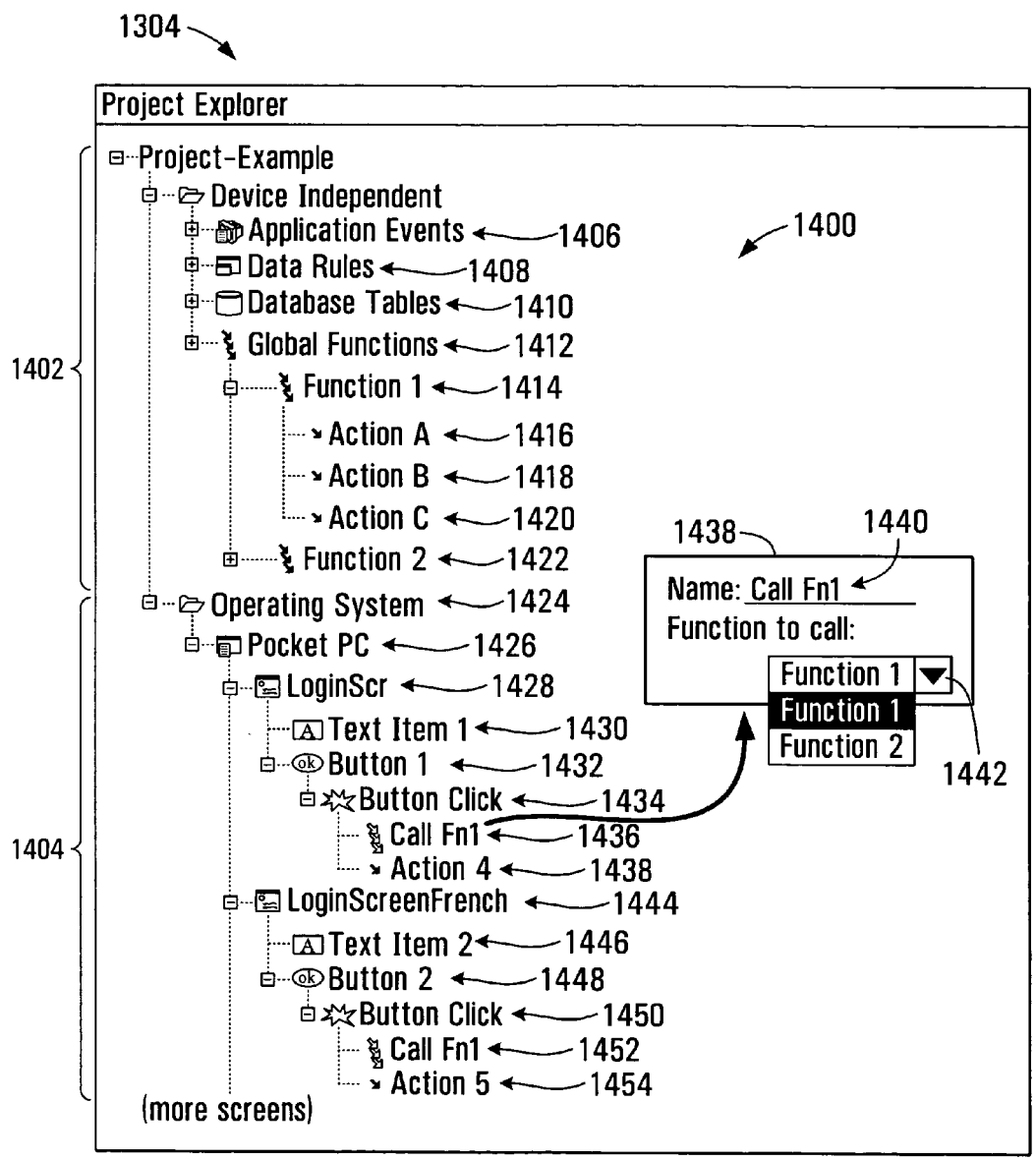
FIG. 14 illustrates a project explorer portion of the RAD tool GUI of FIG. 13 in which exemplary global functions are declared.

FIG. 14 illustrates project explorer 1304 in greater detail. In FIG. 14, a different visual hieararchy 1400, "Project—Example", than that which is shown in FIG. 13 is illustrated. The illustrated project exemplifies a mobile application for a Pocket PC wireless computing device. As will be described, the mobile application utilizes global functions to efficiently declare a set of actions that is executed in multiple scenarios.

The visual hierarchy 1400 includes platform-independent components 1402 and platform-specific components 1404. Platform-independent components 1402 are application components (i.e. application building blocks such as GUI screens, definitions of significant events, and actions to be performed upon the occurrence of these events) which are not specific to a particular type of wireless communication device and may therefore alternatively be considered "platform-independent" (or "device-independent"). Platform-specific components 1404, on the other hand, are application components that may vary from wireless communication device type to wireless communication device type. For example, the GUI screens of a mobile application may differ in some measure between wireless communication device types, due to differences in the capabilities of the devices (e.g. screen size and supported display elements). As will be appreciated, application components generally correspond to XML elements within the master definition file 58 that will be generated by the RAD tool 116.

As shown in FIG. 14, the platform-independent components 1402, (which comprise the "Device Independent" branch of the visual hierarchy,) include application events 1406, data rules 1408, database tables 1410 and global functions 1412.

Application events 1406 define the events which trigger processing within the mobile application regardless of the application's status (e.g. regardless of which GUI screen is presently displayed) as well as the actions that are to be performed upon the events' occurrence. For example, the receipt of an XML package at the wireless communication device can be defined as an application level event which results in the display of a message box for example. Application level events are to be distinguished from screen level events (arrival of an XML package when a specific screen is displayed) and control level events (user manipulation of a GUI control such as a button press), which are defined separately from application level events 1406. An exemplary definition of a control-level event is described below.

Data rules 1408 dictate how XML packages received from enterprise applications affect data stored in database tables associated with an application. A rule may define which field (s) of a table will be impacted by incoming data and the nature of the impact. Because rules make reference to database tables, logically they are defined after the tables (described below) have been defined. Rules also dictate how to apply changes to database tables from XML created in an outgoing XML transaction. Like application-level events 1406, data rules 1408 are device independent.

Database tables 1410 are defined by a developer for purposes of storing data at run time for use by the mobile application executing at the wireless communication device.

Global functions 1412 contain definitions of global functions for the mobile application, which are a focus of the present description. A global function is a named aggregation or set of actions which can be referenced from other areas of the visual hierarchy 1400 where the actions might otherwise be declared (i.e., from any event declaration in hierarchy 1400). The referencing event declaration defines the circumstances in which the actions comprising the referenced global function will be triggered. A global function may be warranted when the same set of N actions (N being an integer greater than one) should be executed in more than one scenario of a mobile application. Each global function defines actions to be executed and a sequence for execution. By referencing a global function from multiple places within the visual hierarchy 1400, instead of repeatedly declaring the same set of actions, the developer may simplify implementation. Moreover, maintainability is improved, because any changes to the set of actions need only be effected in one place, i.e., the global function.

In the illustrated embodiment, the global functions section 1412 of FIG. 14 contains two global function definitions 1414 and 1422.

The first global function definition 1414, "Function 1, contains definitions for three actions A, B and C. The first action 1416, "Action A" causes an XML package representing a login message with predetermined username and password field values to be sent from the wireless communication device 10 to the transaction server 70. The second action 1418, "Action B", and the third action 1420, "Action C"; each cause the wireless communication device 10 to activate the configured notification for the device (e.g. to play a "beep"). The order of the actions A, B and C determines their sequence of execution. Global function 1414 thus constitutes "unit" of code which causes the wireless communication device 10 to send an XML package login message and to activate the configured notification twice, in that sequence. As will be appreciated, the definition of this global function is motivated by the fact that the mobile application requires that set of actions A, B and C to be executed in that sequence in more than one scenario.

The procedure for defining the global function 1414 in the project explorer window 1304 may be as follows. The icon corresponding to the global functions section 1412 may initially be selected with a mouse (or similar user input mechanism 145) of the RAD tool 116 (FIG. 12). A right-click (or similar user action) may cause a pop up menu to be displayed. The pop-up menu may present a list of permissible application components that may be defined within the global functions section 1412). An Add Function option may permit the user to define a new global function. Selection of that menu item may cause a new global function icon 1414 to be created below icon 1412, as shown in FIG. 14, and a Function Properties window to be displayed in the main design area 1306 (FIG. 13). The Function Properties window may permit the user to enter properties of the newly-defined global function. The Function Properties window may include a Function Name field for defining a unique function name that is not already in use by any other global function. The name uniqueness constraint ensures that each global function may be uniquely identified from other areas of the visual hierarchy 1400. In the present example, it is assumed that the name "Function1" is entered, thus that name is displayed as part of the icon at 1414.

Subsequently, the newly-defined icon corresponding to function 1414 may be selected and the mouse again right-clicked to cause another, different pop-up menu to be displayed. This pop-up menu may contain a list of permissible application components that may be defined within a function. An Add Action option may permit the user to declare a new action. (Actions can be used to navigate to different portions of the application or to handle application data.) The RAD tool 116 may for example support the different action types described in Appendix "A". Each action type instructs the application to perform a different operation, thus the properties associated with each action type vary.

Selection of the Add Action menu item may cause a new action icon at 1416 to be created below the icon at 1414 and an Action Properties window to be displayed in the main design area 1306 for entering properties associated with the newly-defined action. The Action Properties window may include an Action Name field for entering a name (e.g. "ActionA") and an Action Type drop down list for selecting the type of action. The drop down list may contain a predetermined list of possible action types (e.g. as described in Appendix "A"). When one of the action types is selected, the Action Properties window may be updated for entering further properties associated with the selected action type.

In the present example, the action type for the first action A is set to "XML Transaction", and the remaining properties are also set, so as to define an action which causes an XML package comprising a login request with a fixed username field of "SMITHJ" and a fixed password of "ABC321" to be sent to the transaction server 70. Definition of this action may involve typing the XML text comprising the message into an XML Text field.

By repeating the above-described steps for adding an action, but selecting a different action type "Notify" (rather than "XML Transaction") which has no properties, a second action with the name "ActionB", as represented by icon 1418, for causing the configured notification for the wireless communication device 10 to be activated, is defined. A further repetition of these steps results in the definition of action "ActionC" as represented by icon 1420. The definition of the first global function 1414 is thus completed.

A similar procedure may be followed to create the second global function 1422. The set of actions defined under global function 1422, (which are not visible in the project explorer window 1304 due to the fact that the portion of the visual hierarchy 1402 below the function definition 1422 has not been expanded), may be partly or wholly different from those defined in the first global function 1414.

Turning to the platform-specific components section 1404 of visual hierarchy 1400, (which comprises the "Operating Systems" branch), this section permits the definition of wireless communication device type-specific aspects of an application, which primarily comprise the displayable GUI screens and associated functionality of an application. In FIG. 14, GUI screens are defined for only one platform, namely the Pocket PC platform, which is represented by "Pocket PC" branch 1426.

Two GUI screen definitions 1428 and 1444 are illustrated in Pocket PC branch 1426 (other Pocket PC GUI screen definitions being omitted from FIG. 14 for brevity). Screen definition 1428 defines the GUI screen 1500 of FIG. 15 and screen definition 1444 defines a similar GUI screen 1600 of FIG. 16.

Figure 15:
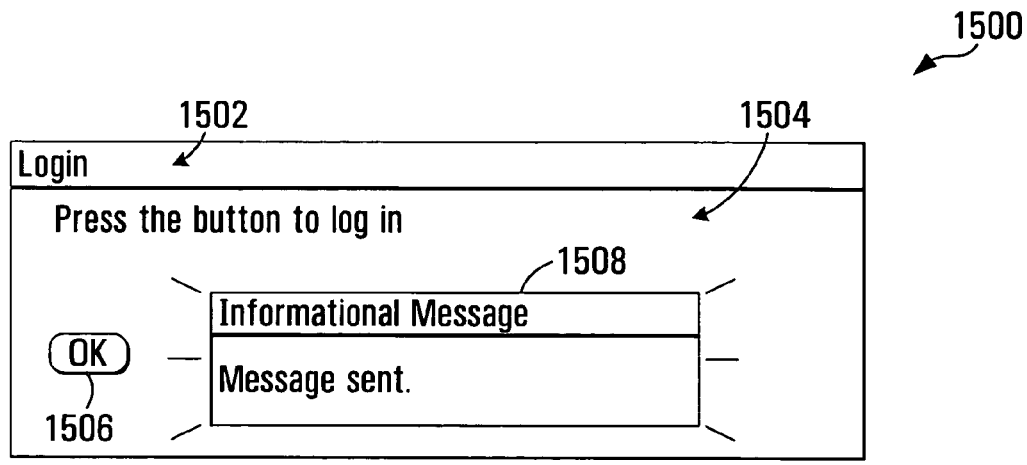
FIG. 15 illustrates a login screen for a Pocket PC wireless computing device defined in the project explorer of FIG. 14.

Referring to FIG. 15, it can be seen that GUI screen 1500 has a title 1502 ("Login"), a text item 1504 ("Press the button to log in") and an "OK" button 1506. The desired behavior for the screen is for four actions to occur upon selection of the "OK" button 1506. First, an XML package comprising a login request with a fixed username field of "SMITHJ" and a fixed password of "ABC321" should be sent to the transaction server 70. Second, a notification sound should be played. Third, the notification sound should be repeated. Fourth, a message box 1508 with a title "Informational Message" and a message "Message sent.", as shown in FIG. 15, should be displayed.

Figure 16:
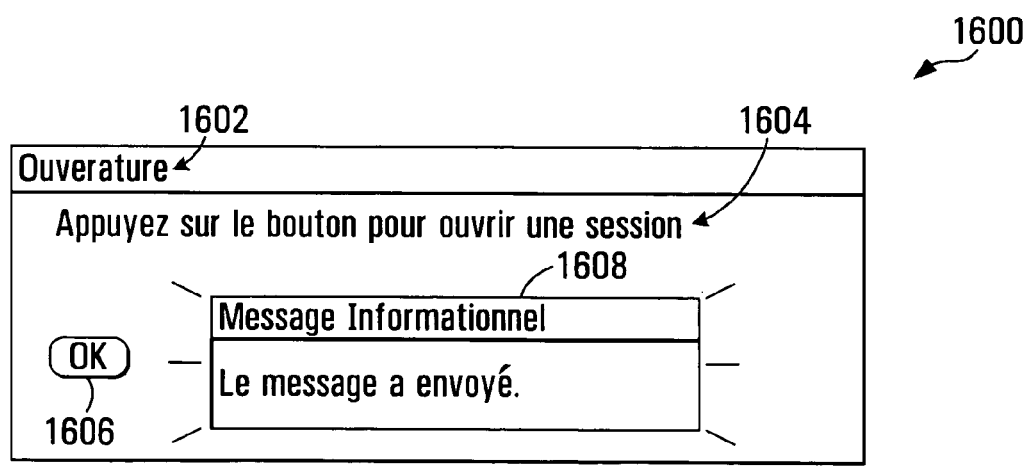
FIG. 16 illustrates a French language version of the login screen of FIG. 15 that is also defined in the project explorer of FIG. 14.

FIG. 16 illustrates the other GUI screen 1600. Screen 1600 is intended for display instead of GUI screen 1500 only in the case where logic within the mobile application has determined that the wireless computing device user prefers display of GUI screens in the French language. The GUI screen 1600 is analogous in non-textual appearance and operation to GUI screen 1500 of FIG. 15. For example, screen 1600 also has a title 1602, a text item 1604, an "OK" button 1606 and a message box 1608. Moreover, the design of screen 1600 is such that, upon selection of the "OK" button 1606, the same four actions as described above occur. However the textual aspects of the display elements, such as title 1602, text item 1604, and the textual components of the message box 1608, are in the French language.

Screen 1500 of FIG. 15 is defined in GUI screen definition 1428 of FIG. 14. The procedure for creating the screen definition 1428 in the project explorer window 1304 may involve steps that are similar to above-described steps for defining global functions 1412. For example, right-clicking of the Pocket PC branch 1426 may pop up a menu having a "New Screen" option. Selection of that option may cause the icon 1428 to be created. A unique screen name typed into a screen name field of a Screen Properties window (which may be displayed in the main design area 1306), "LoginScr", becomes part of the icon 1428 representing the screen. The title 1502 for the screen ("Login") may be typed in a title field of the Screen Properties window.

Below icon 1428 within the hierarchy, two icons 1430 and 1432 are created. The first icon 1430 represents the text item 1504 of FIG. 15. The second icon 1432 represents the "OK" button 1506 of FIG. 15. Each of these application components may be created by right-clicking the icon 1428, choosing the appropriate new display element to be added (from a pop-up menu or a toolbar for example) and defining the new display element's properties in an associated properties window.

A ButtonClick event 1434 is declared below the button icon 1432. This event represents the selection of the "OK" button 1506 of FIG. 15 by a wireless communication device user. Right-clicking of the event 1434 in project explorer 1304 causes another pop-up menu to be displayed. The options that are presented on the displayed pop-up menu include an Add Function Call option (assuming that at least one global function has been declared) and an Add Action option. These two options represent the two ways in which wireless communication device behavior responsive to the occurrence of an event may be specified.

The first option, Add Function Call, permits a reference to a previously-defined global function to be created. This option may be selected to create function call icon 1436. The definition of properties in an associated a Function Call Properties window displayed in main design area 1306 is illustrated in inset 1438. A name field 1440 contains a user-specified name ("CallFn1") that will be displayed as part of the icon 1436. A "Function To Call" field 1442 provides a drop-down list which lists, by (unique) name, each global function defined in the global functions section 1412. In FIG. 14, the list 1442 is illustrated in a dropped-down state, with two entries, namely Function1 and Function2, corresponding to the two previously-defined global functions 1414 and 1422, being visible. The heavy border around the first entry, Function1, indicates that this field has been selected by the user of RAD tool 116, such that the function call 1436 defines a call to Function1. As will be appreciated, function call 1436 is operationally equivalent to the creation of actions 1416, 1418 and 1420 below the ButtonClick event 1434.

A further action 1438 ("Action4") which causes English language message box 1508 (FIG. 15) to be displayed may be defined by right-clicking the ButtonClick event 1434 of hierarchy 1400, selecting pop-up menu option "Add Action", and typing the desired message box title and message content in the Action Properties window.

The procedure for creating screen definition 1444 representing the other screen 1600 (FIG. 16) is virtually identical to the above-described steps for creating screen definition 1428, except that the textual content for screen 1600 is typed in French. The resultant application components, namely text item 1446, button 1448, ButtonClick event 1450, function call 1452, and action 1454 are accordingly the same as text item 1430, button 1432, ButtonClick event 1434, function call 1436, and action 1438, respectively.

Notably, the same global function ("Function1") that is referenced by function call 1436 for the English language screen 1500 is also referenced by function call 1452 for the French language screen 1600. This reflects the fact that the same actions are to be performed upon selection of the "OK" button regardless of which of the English language or French language screens 1500 or 1600 is displayed. Because all of the actions 1414, 1416 and 1418 comprising the referenced function "Function1" are language-neutral (i.e. none of them cause any textual content to be displayed), they may be defined only once in the form of a global function, and the global function may then be referenced from each screen. In contrast, language-specific actions, which have different textual content on screens 1500 and 1600, are defined once for the English language screen 1500 and once for the French language screen 1600. Generally, actions which are specific to a platform, screen or event will be defined within the context of that platform, screen or event, as there is little motivation for defining such actions within a global function that would be referenced only once.

It will be appreciated that global functions are not necessarily always referenced from the context of a control-level event. Global functions may also be referenced from screen-level or application-level events.

Referring to FIGS. 17A-17B, the master definition DOM tree 150 of FIG. 12 is illustrated in greater detail. DOM tree 150 is represented textually as XML in FIGS. 17A-17B for ease of reference. It will be appreciated that the DOM tree 150 in memory 132 of RAD tool 116 (FIG. 12) is actually a dynamically-accessible representation. The DOM tree 150 of FIGS. 17A-17B corresponds to the mobile application design illustrated in the project explorer 1304 of FIG. 14. That is, the DOM tree 150 is automatically generated in memory 132 by RAD tool 116 as a result of the developer's creation of the "Project-Example" hierarchy 1400 of FIG. 14.

Two relevant portions of the master definition DOM tree 150 are illustrated in FIGS. 17A-17B. The first portion 1700 (lines 2-19 of FIG. 17A) corresponds to the global functions section 1412 of FIG. 14. The second portion 1702 (lines 21-61 of FIGS. 17A-17B) correspond to the platform-specific components section 1404 of FIG. 14. Other portions of the master definition DOM tree 150 are omitted for brevity.

In the description which follows, the term "XML element", "XML element instance", and "instance of an XML element" are understood to be synonymous. Each of these is a form of markup language element, or an "instance of" a markup language element.

In the first portion 1700, an outermost XML element, FUNCTIONS, contains two hierarchies of XML elements (i.e. two markup language hierarchies or sub-trees within DOM tree 150). The first hierarchy, which appears at lines 3-13 of FIG. 17, corresponds to the first global function 1414. The second hierarchy, which appears at lines 14-18 of FIG. 17, corresponds to the second global function 1422. Each hierarchy has a parent XML element, FUNCTION, and contains a number of instances of the ACTION element which, as previously noted, defines an action to be performed by the wireless computing device 10. It is noted that the XML elements FUNCTIONS and FUNCTION are extensions of the XML elements and attributes identified in Appendix "A".

In the first markup language element hierarchy, the ACTION element at lines 4-10 corresponds to action 1416 of FIG. 14. When interpreted and executed by the virtual machine software 24 of a wireless computing device 10 (FIG. 1), this ACTION element causes a login message (whose "body" is defined at lines 6-8) to be sent from the device 10 to the transaction server 70. The ACTION elements at lines 11 and 12, on the other hand, correspond to actions 1418 and 1420 of FIG. 14, and each result in the playing of a notification sound at the wireless communication device 10.

The second markup language element hierarchy also contains multiple ACTION elements at lines 15-17 whose details omitted for brevity.

The second portion 1702 of DOM tree 150 defines the GUI screens for Pocket PC mobile application, which include screens 1500 and 1600 of FIGS. 15 and 16 respectively. In particular, lines 24-40 of FIGS. 17A-17B define English language screen 1500 while lines 41-57 of FIG. 17B define French language screen 1600.

Examining lines 24-40 more closely, it can be seen that XML elements and attributes at lines 31-39 define the "OK" button 1506 (FIG. 15). The XML elements include an EVENT element at lines 33-37 which defines the ButtonClick event 1434 (FIG. 14). The EVENT element in turn contains a FNCALL element at line 33 referencing a global function. More specifically, the FNCALL element has a CALLEDFN attribute whose value, "Function1", uniquely identifies the hierarchy of XML elements at lines 3-13 of FIG. 17A as the global function whose actions are to be executed upon occurrence of the ButtonClick event. The ACTION element at lines 35-36 of FIG. 17B, on the other hand, corresponds to the message box action 1438 of FIG. 14, which is declared immediately within the containing EVENT element.

Turning to lines 41-57 of FIG. 17B, it can be seen that the XML elements and attributes which define screen 1600 are similar to those defining screen 1500, except that the textual components are in the French language. It is noted that the CALLEDFN attribute of the FNCALL markup language element at line 50 (which corresponds to the function call 1452 of FIG. 14) is the same as the CALLEDFN attribute of the FNCALL markup language element at line 33, since both reference the same global function 1414.

FIGS. 18A-18B illustrate the master definition file 58 (an XML document) that is generated through serialization of the master definition DOM tree 150 of FIGS. 17A-17B. Only the portion of the master definition file 58 which defines the two GUI screens 1500 and 1600 for the Pocket PC platform is illustrated in FIGS. 17A-18B. Screen 1500 is defined at lines 3-30 of FIG. 18A, while screen 1600 is defined at lines 31-55 of FIGS. 18A-18B.

Referring first to FIG. 18A, it can be seen that the definition of screen 1500 at lines 3-30 represents a "merging" of the English language screen definition at lines 24-40 of FIGS. 17A-17B of the master definition DOM tree 150 and the definition of the first global function at lines 3-13 of FIG. 17A of the master definition DOM tree 150. In essence, the screen definition at lines 3-30 of FIG. 18A is a reproduction of the screen definition at lines 24-40 of FIGS. 17A-17B, with the exception that the FNCALL element at line 33 of FIG. 17A has been replaced with all of the ACTION elements which make up the referenced global function (i.e., with the three actions defined at lines 4-12 of FIG. 17A). The resulting markup language at lines 14-23 of FIG. 18A is the same as if those three actions had originally been defined within the ButtonClick EVENT element, like the action 1438 (see lines 35-36 of FIG. 17B).

Similarly, the definition of screen 1600 at lines 31-55 of FIGS. 18A-18B represents a "merging" of the French language screen definition at lines 41-57 of the master definition DOM tree 150 (FIG. 17B) and the definition of the first global function at lines 3-13 of the master definition DOM tree 150 (FIG. 17A). The FNCALL element at line 51 of FIG. 17A has again been replaced with the three actions defined at lines 4-12 of FIG. 17A. The resulting markup language at lines 40-48 is the same as if those three actions had originally been defined within the context of the ButtonClick EVENT element, like action 1454 (corresponding to lines 51-52 of FIG. 17B).

It will be appreciated that XML elements FUNCTION and FUNCTION do not appear in the resultant master definition file 58. This illustrates the fact that global functions are simply a design-time convenience for the user of RAD tool 116 which facilitate implementation of mobile applications in which the same set of actions are to be performed in multiple scenarios. Global functions do not form part of the mobile application per se.

The resultant master definition file 58 may be used by the baseline system for presenting server-side applications at varied wireless communication devices as described in section I above.

In the above-described embodiment, the master definition file 58 of FIGS. 18A-18B is generated by machine-readable code comprising the RAD software 130 which traverses and serializes the DOM tree 150 using the above-described technique for substituting global function references with the actions of the referenced function. This traversal and serialization are performed upon user selection of a "publish" command of RAD tool 116. However, the master definition file 58 could alternatively be generated by machine-executable parser code which parses a textual version of the master definition DOM tree 150 (as shown in FIGS. 17A-17B for example).

It should be understood that the approach for facilitating generation of a markup language document containing identical sets of markup language elements as described hereinabove is not necessarily limited to markup language documents pertaining to mobile applications and wireless computing device action. The approach may be used to simplify the generation of virtually any markup language document containing identical sets of markup language elements. Moreover, the approach may be used for various representations of a markup language document, such as textual markup language document files, DOM tree representations, or otherwise.

Use of the term "markup language document" or "XML document" herein is understood to include not only textual (e.g. ASCII) electronic files, but other document representations, such as DOM trees or Simple API for XML (SAX) representations for example.

As will be appreciated by those skilled in the art, modifications to the above-described embodiment can be made without departing from the essence of the invention. For example, another markup language such as Standard Generalized Markup Language could be employed instead of XML.

It is possible that global functions could reference other global functions, such that a developer could "build upon" one global function in another. This may be useful in the case where N global functions (N being an integer greater than 1) should contain the same subset of ACTION elements. Instead, that subset of ACTION elements could be defined in a further global function that is simply referenced from each of the N global functions.

Other modifications will be apparent to those skilled in the art and, therefore, the invention is defined in the claims.

APPENDIX "A": ARML Specification

Contents

| | | |
|---|---|---:|
| 1 | Introduction | 45 |
| 1.1 | Purpose of document | 45 |
| 1.2 | Audience | 45 |
| 1.3 | Definitions & Acronyms | 45 |
| 2 | ARML Overview | 46 |
| 2.1 | ARML design considerations | 46 |
| 2.2 | ARML usage | 47 |
| 2.3 | The scratchpad area | 47 |
| 2.4 | System Variables and Functions | 47 |
| 2.4.1 | Variables: | 47 |
| 2.4.2 | Functions: | 48 |
| 2.5 | Single-Field Lookup | 48 |
| 3 | ARML application definition | 49 |
| 3.1 | General | 49 |
| 3.1.1 | Description | 49 |
| 3.1.2 | Structure | 49 |
| 3.1.3 | Tags | 49 |
| 3.2 | Table Definitions Section | 51 |
| 3.2.1 | Description | 51 |
| 3.2.2 | Structure | 51 |
| 3.2.3 | Tags | 51 |
| 3.2.4 | Example | 52 |
| 3.3 | Package Definitions Section | 53 |
| 3.3.1 | Description | 53 |
| 3.3.2 | Structure | 53 |
| 3.3.3 | Tags | 53 |
| 3.3.4 | Example | 55 |
| 3.4 | Device Interface Definitions Section | 56 |
| 3.4.1 | Description | 56 |
| 3.4.2 | Structure | 56 |
| 3.4.3 | Tags | 56 |
| 3.4.4 | Example | 57 |
| 4 | Application-defined packages | 57 |
| 4.1 | General | 57 |
| 4.1.1 | Description | 57 |
| 4.1.2 | Structure | 57 |
| 4.1.3 | Tags | 57 |
| 4.2 | Package information | 59 |
| 4.2.1 | Example | 59 |
| 5 | User interface Definitions | 62 |
| 5.1 | General | 62 |
| 5.1.1 | Description | 62 |
| 5.1.2 | Structure | 62 |
| 5.1.3 | Tags | 62 |
| 5.2 | Queries definition section | 64 |
| 5.2.1 | Description | 64 |

APPENDIX "A": ARML Specification

| | | |
|---|---|---|
| 5.2.2 | Structure | 64 |
| 5.2.3 | Tags | 64 |
| 5.3 | Menu definition section | 65 |
| 5.3.1 | Description | 65 |
| 5.3.2 | Structure | 65 |
| 5.3.3 | Tags | 65 |
| 5.4 | Buttons definition section | 66 |
| 5.4.1 | Description | 66 |
| 5.4.2 | Structure | 66 |
| 5.4.3 | Tags | 66 |
| 5.5 | Text Items definition section | 67 |
| 5.5.1 | Description | 67 |
| 5.5.2 | Structure | 67 |
| 5.5.3 | Tags | 67 |
| 5.6 | Edit boxes definition section | 68 |
| 5.6.1 | Description | 68 |
| 5.6.2 | Structure | 68 |
| 5.6.3 | Tags | 68 |
| 5.7 | Choice items definition section | 69 |
| 5.7.1 | Description | 69 |
| 5.7.2 | Structure | 69 |
| 5.7.3 | Tags | 69 |
| 5.8 | Checkboxes definition section | 71 |
| 5.8.1 | Description | 71 |
| 5.8.2 | Structure | 71 |
| 5.8.3 | Tags | 71 |
| 5.9 | Listboxes definition section | 72 |
| 5.9.1 | Description | 72 |
| 5.9.2 | Structure | 72 |
| 5.9.3 | Tags | 72 |
| 5.10 | Grids | 73 |
| 5.10.1 | Description | 73 |
| 5.10.2 | Structure | 73 |
| 5.10.3 | Tags | 74 |
| 5.10.4 | Example | 75 |
| 6 | The Smart Client event model | 75 |
| 6.1 | The EVENTS tag | 76 |
| 6.2 | The EVENT tag | 76 |
| 6.2.1 | The BUTTONCLICK event | 76 |
| 6.2.2 | The MENUITEMSELECTED event | 76 |
| 6.2.3 | The DATA event | 76 |
| 6.3 | The ACTION tag | 76 |
| 6.3.1 | The OPEN action | 77 |
| 6.3.2 | The ARML action | 77 |
| 6.3.3 | The SAVE action | 77 |
| 6.3.4 | The PURGE action | 77 |
| 6.3.5 | The NOTIFY action | 77 |
| 6.3.6 | The CLOSE action | 77 |
| 6.3.7 | The ALERT action | 77 |

APPENDIX "A": ARML Specification

| | | |
|---|---|---|
| 6.3.8 | The INTEGRATION action | 78 |
| 6.3.9 | The CLOSESCREEN action | 78 |
| 6.3.10 | The REFRESH action | 78 |
| 6.3.11 | The SAVEITEM action | 78 |
| 6.3.12 | The IF Action | 78 |
| Example of airix event model | | 81 |
| 7 | AVM-server system interactions | 82 |
| 7.1 | General | 82 |
| 7.1.1 | Description | 82 |
| 7.1.2 | Structure | 82 |
| 7.1.3 | Tags | 82 |
| 7.2 | Device Registration & deregistration package | 84 |
| 7.2.1 | Description | 84 |
| 7.2.2 | Structure | 84 |
| 7.2.3 | Tags | 84 |
| 7.2.4 | Example | 84 |
| 7.3 | Registration confirmation package | 85 |
| 7.3.1 | Description | 85 |
| 7.3.2 | Structure | 85 |
| 7.3.3 | Tags | 85 |
| 7.3.4 | Example | 85 |
| 7.4 | Find applications package | 87 |
| 7.4.1 | Description | 87 |
| 7.4.2 | Structure | 87 |
| 7.4.3 | Tags | 87 |
| 7.5 | Find applications confirmation package | 88 |
| 7.5.1 | Description | 88 |
| 7.5.2 | Structure | 88 |
| 7.5.3 | Tags | 88 |
| 7.6 | Application Registration & deregistration package | 89 |
| 7.6.1 | Description | 89 |
| 7.6.2 | Structure | 89 |
| 7.6.3 | Tags | 89 |
| 7.7 | Application registration & deregistration confirmation package | 90 |
| 7.7.1 | Description | 90 |
| 7.7.2 | Structure | 90 |
| 7.7.3 | Tags | 90 |
| 7.7.4 | Example | 90 |
| 7.8 | Setting the active device package | 92 |
| 7.8.1 | Description | 92 |
| 7.8.2 | Structure | 92 |
| 7.8.3 | Tags | 92 |
| 7.8.4 | Example | 92 |
| 7.9 | Set active device response | 92 |
| 7.9.1 | Description | 92 |
| 7.9.2 | Structure | 92 |
| 7.9.3 | Tags | 92 |
| 7.9.4 | Example | 93 |
| 7.10 | Invalid Application package | 93 |
| 7.10.1 | Description | 93 |

APPENDIX "A": ARML Specification

| | | |
|---|---|---|
| 7.10.2 | Structure | 93 |
| 7.10.3 | Tags | 93 |
| 7.10.4 | Example | 93 |
| 8 | Application-server system interactions | 93 |
| 9 | ARML future developments | 94 |

APPENDIX "A": ARML Specification

1. Introduction

1.1 Purpose of document
This document describes the structure and syntax of the ARML language.

1.2 Audience
The document is intended to be read by AIRIX developers and users of ARML.

1.3 Definitions & Acronyms

| | |
|---|---|
| ARML | AIRIX Markup Language |
| XML | Extensible Markup Language |

APPENDIX "A": ARML Specification

2 ARML Overview

ARML is an XML markup language used by the AIRIX platform. It performs three tasks;

- Data is passed back and forth between the mobile server, AIRIX platform and enterprise application using ARML.
- The AIRIX Smart Client uses ARML to define the user interface for an AIRIX-enabled application on the mobile device
- The AIRIX server uses ARML to define that data that it stores for the application in its database.

2.1 ARML design considerations

ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

APPENDIX "A": ARML Specification

2.2 ARML usage

The diagram below illustrates how ARML is used.

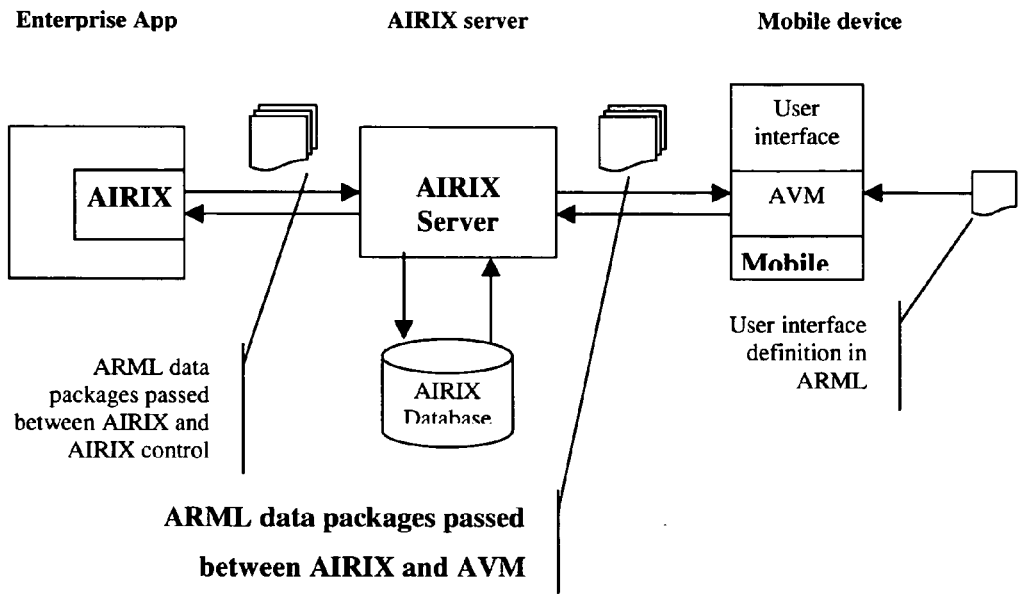

Figure 1 -The ARML environment

The key to ARML usage is the application definition file held on the AIRIX server. This file defines the AIRIX tables for the application, the allowed message set and the user interface definitions for the application on a given device.

2.3 The scratchpad area

The scratchpad is used as a temporary storage area where a global value or a value associated to a screen can be saved for future use. The syntax for a scratchpad value is as follows:
    screen scratchpad value: [SP.*screen.savename*]
    global scratchpad value: [SP.*.*savename*]

The syntax for retrieving a global scratchpad value can also be used to retrieve screen scratchpad values.

2.4 System Variables and Functions

There are several variables that are available that will retrieve application and system values to be used throughout the application. The syntax for these variables are as follows:

2.4.1 Variables:
[DATE] – returns the current system date, formatted as dd mmm yy

APPENDIX "A": ARML Specification

[TIME] – returns the current system time, formatted as hh:mm:ss am/pm.
[SYS.VAR.DATE] - returns the current system date, formatted as dd mmm yy
[SYS.VAR.MOBILEID] - retrieves the device's Mobile ID
[SYS.VAR.APPNAME] - retrieves the name of the application.
    [SYS.VAR.APPVERSION] - retrieves the version number of the application.

[SYS.VAR.SCVERSION] - retrieves the version number of the Smart Client.
[SYS.VAR.ARMLMAJOR] - retrieves the ARML major version of the application.
[SYS.VAR.ARMLMINOR] - retrieves the ARML minor version of the application.

2.4.2 Functions:
[SYS.FUNC.DATEADD([SYS.VAR.DATE],+-$x$)] - The Date Arithmetic tag is used to add or subtract days from the current date. In the tag, $x$ represents the number of days added or subtracted. Developers can also choose to substitute a hard-coded date value in the Date Arithmetic tag, in the place of the [SYS.VAR.DATE] tag.

[SYS.FUNC.DATETOSTR([SYS.VAR.DATE],d mmm yyyy h:nn:ss tz)] - The Date To String tag is used to convert date data to a string value.

[SYS.FUNC.STRTODATE([SYS.VAR.DATE],d mmm yyyy h:nn:ss tz)] - The String to Date tag is used to convert string data to a date value, in the RFC 1123 format.

2.5 Single-Field Lookup
The single-field lookup will run a simple SELECT query with one where clause to retrieve specific data. The syntax is as follows:

[DB.DOLOOKUP(*table, field,wherefield,wherevalue*)]

APPENDIX "A": ARML Specification

3 ARML Application Definition

3.1 General

3.1.1 Description
The application definition section defines the AIRIX tables and ARML data packages that are used for transactions involved with a specific application.

3.1.2 Structure
The ARML application definition has the following structure;

```
<ARML>
      <AXSCHDEF>
                                              <EVENTS>
                                                   <EVENT>
                             (action definitions)
                                                   </EVENT>
                                              </EVENTS>
            <AXTDEFS>
                  (table definitions)
            </AXTDEFS>
            <DPACKETS>
                  (data package definitions)
            </DPACKETS>
            <DEVICES>
                  (device interface definitions)
            </DEVICES>
      </AXSCHDEF>
</ARML>
```

3.1.3 Tags

3.1.3.1 The <AXSCHDEF> tag
These tags (<AXSCHDEF>...</AXSCHDEF>) mark the start and end of the application definition. THE AXSCHDEF tag has two attributes;

| Attribute | Optional? | Description |
| --- | --- | --- |
| APPNAME | No | The name of the application |
| VERSION | No | Which version of the application the file describes |
| DESC | No | A text description of the application for display purposes |
| ARMLMAJOR | No | The major version of the ARML language this application definition was created with. |
| ARMLMINOR | No | The minor version of the ARML language this application definition was created with. |

3.1.3.2 The <EVENTS> tag
The <EVENT>...</EVENT> pair marks the start and end of a user-interface level event definition. See section 6 for a detailed discussion of the Smart Client event model.

3.1.3.3 The <EVENT> tag
The <EVENT>...</EVENT> pair marks the start and end of a user-interface level event definition. See section 6 for a detailed discussion of the Smart Client event model.

3.1.3.4 The <AXTDEFS> tag

APPENDIX "A": ARML Specification

The <AXTDEFS>...</AXTDEFS> pair marks the start and end of the table definitions section. It has no attributes.

3.1.3.5 The <DPACKETS> tag

The <DPACKETS>...</DPACKETS> pair marks the start and end of the data package definitions section. It has no attributes.

3.1.3.6 The <DEVICES> tag

The <DEVICES>...</DEVICES> pair marks the start and end of the device interface definitions section. It has no attributes.

APPENDIX "A": ARML Specification

3.2 Table Definitions Section

3.2.1 Description
The table definitions section defines the tables on the mobile device for the application

3.2.2 Structure
The table definitions section has the following structure;

```
{wrapper tags}
<TDEF>
      <FIELDS>
            <FLD>...</FLD>
      <FIELDS>
</TDEF>
 (etc.)
{wrapper tags}
```

3.2.3 Tags

3.2.3.1 The <TDEF> tag
Each table definition is enclosed within the <TDEF>...</TDEF> pair. The TDEF tag has the following attributes;

| Attribute | Optional? | Description |
|---|---|---|
| NAME | No | The number of table definitions in the section |
| PK | No | Which of the table fields is the primary key for the table |
| DELINDEX | No | The index of this table with respect to all the tables for specifying the delete order. This value is 1 based. |

3.2.3.2 The <FIELDS> tag
The <FIELDS>...</FIELDS> tag pair marks where the fields in a given table are defined. The FIELDS tag has a no attributes.

3.2.3.3 The <FLD> tag
The <FLD>...</FLD> tag pair defines a single field in a table. Enclosed between the tags is the field name. The <FLD> tag has the following structure;

| Attribute | Optional? | Description |
|---|---|---|
| TYPE | No | The data type contained in the field. Permitted values are:<br>INT – integer value<br>STRING – a fixed-length string of n characters (see SIZE field)<br>MEMO – a string of max 65535 characters<br>AUTOINC – an integer value, automatically incremented by the database. This field will be read-only to the applications.<br>DATETIME – a datetime value |
| SIZE | No | If the TYPE is set to STRING, this field specifies the number of characters in the field |
| INDEXED | No | Specifies if the field needs to be indexed in the AIRIX database |
| REFERENCEFIELD | Yes | If this attribute is present, it defines that this field is a foreign key. The foreign table/field is given in the format "table(field)" |
| ALLOWNULL | No | Specifies if the field is allowed to have a null value |

APPENDIX "A": ARML Specification

3.2.4 Example
An email application would use 2 tables for storing sent emails.

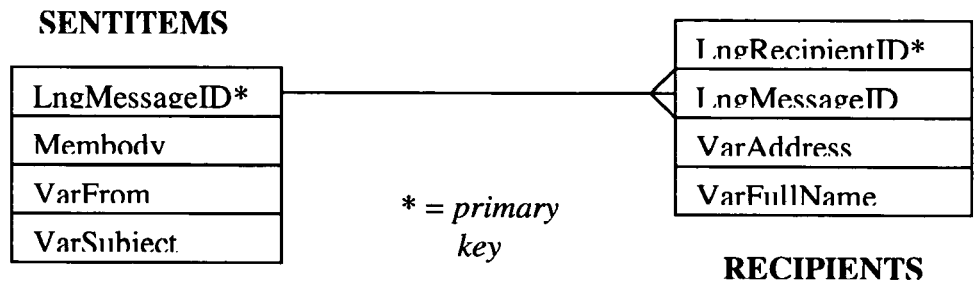

Figure 2 - sample email schema

This translates into the following ARML fragment;

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" REFERENCEFIELD=""
            ALLOWNULL="NO">LNGMESSAGEID</FLD>
        <FLD TYPE="STRING" SIZE="200" INDEXED="NO" REFERENCEFIELD=""
            ALLOWNULL="YES">VARFROM</FLD>
        <FLD TYPE="MEMO" SIZE="0" INDEXED="NO" REFERENCEFIELD=""
            ALLOWNULL="YES">MEMBODY</FLD>
        <FLD TYPE="STRING" SIZE="200" INDEXED="NO" REFERENCEFIELD=""
            ALLOWNULL="YES">VARSUBJECT</FLD>
    </FIELDS>
</TDEF>
<TDEF NAME="RECIPIENTS" UPDATETYPE=NEW PK=LNGRECIPIENTID DELINDEX=1>
    <FIELDS>
        <FLD TYPE="INT" SIZE="AUTOINC" INDEXED="NO" REFERENCEFIELD=""
            ALLOWNULL="NO">LNGMESSAGEID</FLD>
        <FLD TYPE="INT" SIZE="0" INDEXED="YES"
            REFERENCEFIELD="SENTITEMS(MESSAGEID)"
            ALLOWNULL="NO">LNGMESSAGEID</FLD>
        <FLD TYPE="STRING" SIZE="200" INDEXED="NO" REFERENCEFIELD=""
            ALLOWNULL="YES">VARFULLNAME</FLD>
        <FLD TYPE="STRING" SIZE="200" INDEXED="NO" REFERENCEFIELD=""
            ALLOWNULL="YES">VARADDRESS</FLD>
    </FIELDS>
</TDEF>
```

Figure 3 - a sample table definition section

APPENDIX "A": ARML Specification

3.3 Package Definitions Section

3.3.1 Description

The package definitions section defines the structure of the application packages and the data that they carry.

3.3.2 Structure

The package definitions section has the following structure;

```
{wrapper tags}
<AXDATAPACKET>
       <TABLEUPDATES>
              <TUPDATE>
                     <PKGFIELDS>
                            <PKGFLD>...</PKGFLD>
                            <PKGFLD>...</PKGFLD>
                     </PKGFIELDS>
              </TUPDATE>
       </TABLEUPDATES>
       <TABLEUPDATES>
              <TUPDATE>
                     <PKGFIELDS>
                            <PKGFLD>...</PKGFLD>
                            <PKGFLD>...</PKGFLD>
                            (etc.)
                     </PKGFIELDS>
              </TUPDATE>
       </TABLEUPDATES>
       (etc.)
</AXDATAPACKET>
{wrapper tags}
```

3.3.3 Tags

3.3.3.1 The <AXDATAPACKET> tag

The <AXDATAPACKET>...</AXDATAPACKET> pair delimits a package definition. The tag has the following attributes;

| Attribute | Optional? | Description |
|---|---|---|
| BODY | No | This field gives the name by which the data package is known |
| UPDATELOCALDATA | No | Specifies whether the package is to update the local database. |
| SENDTOAPP | No | Specifies whether the package is sent to the application server |

3.3.3.2 The <TABLEUPDATES> tag

The <TABLEUPDATES>...</TABLEUPDATES> pair marks the start and end of the table definitions section. It has no attributes.

3.3.3.3 The <TUPDATE> tag

Each table update is enclosed within the <TUPDATE>...</TUPDATE> pair. The TUPDATE tag has the following attributes;

| Attribute | Optional? | Description |
|---|---|---|
| TABLE | No | The table in the database that is updated |

APPENDIX "A": ARML Specification

| UPDATETYPE | No | The type of update that is being made to the database. Possible values are; <br> ADD – adds a new record into the table <br> DELETE – removes a record into the table <br> UPDATE – modifies a record in the table |
|---|---|---|
| WHEREFIELD | Yes | For a conditional update of a table, specifies the field and table to match on. This is in the format "table(field)". |
| WHEREPARAM | Yes | Text string specifying the value. This tag has no meaning and will be skipped unless the WHEREFIELD attribute has been specified. |
| SECTION | No | An identifier for the section in the data package |
| MULTIROW | No | Boolean field specifying whether multiple rows can be updated by the tag |
| MULTIROWIDENT | Yes | If the MULTIROW attribute is set to 'YES', this field is required and specifies the |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user interface field |
| PARAMTYPE | No | This defines the type of parameter. It can take two values; <br> PROP – this means that the parameter appears as part of the tag definition <br> VALUE – this means that the parameter is contained between the two tags. Only one parameter in a given data package can be of this type |

APPENDIX "A": ARML Specification

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
    <TABLEUPDATES>
        <TUPDATE TABLE="SENTITEMS" UPDATETYPE="ADD" WHEREFIELD="" WHEREPARAM=""
            WHERETYPE="PROP" SECTION="MAIL" MULTIROW="NO" MULTIROWIDENT="">
            <FIELDS>
                <PKGFLD NAME="LNGMESSAGEID" PARAMTYPE="PROP">MSGID</PKGFLD>
                <PKGFLD NAME="VARFROM" PARAMTYPE="PROP">FROM</PKGFLD>
                <PKGFLD NAME="VARSUBJECT" PARAMTYPE="PROP">SUBJECT</PKGFLD>
                <PKGFLD NAME="MEMBODY" PARAMTYPE="VALUE">DATA</PKGFLD>
            </FIELDS>
        </TUPDATE>
        <TUPDATE TABLE="RECIPIENTS" UPDATETYPE="ADD" WHEREFIELD="" WHEREPARAM=""
            WHERETYPE="PROP" SECTION="RECIPS" MULTIROW="YES"
            MULTIROWIDENT="RCP">
            <FIELDS>
                <PKGFLD NAME="LNGMESSAGEID" PARAMTYPE="PROP">MSGID</PKGFLD>
                <PKGFLD NAME="VARFULLNAME" PARAMTYPE="PROP">TO</PKGFLD>
                <PKGFLD NAME="VARADDRESS" PARAMTYPE="PROP">ADDRESS</PKGFLD>
            </FIELDS>
        </TUPDATE>
    </TABLEUPDATES>
</AXDATAPACKET>
```

Figure 4 - a sample package definition

APPENDIX "A": ARML Specification

3.4 Device Interface Definitions Section

3.4.1 Description

The display definitions section contains the user interface definitions for the various mobile devices that an application supports.

3.4.2 Structure

The device display definitions section has the following structure;

```
{wrapper tags}
<DEV>
        <SCREENS>
                <SCREEN>
                        {screen definitions}
                </SCREEN>
        </SCREENS>
</DEV>
(other devices)
{wrapper tags}
```

3.4.3 Tags

3.4.3.1 The <DEV> tag

The <DEV>...</DEV> pair delimits an interface definition for a specific device. The tag has the following attributes;

| Attribute | Optional? | Description |
| --- | --- | --- |
| TYPE | No | The type of device. Allowed values are: RIM – a Research in Motion Blackberry pager WAP – a WAP phone CE – Pocket PC |

3.4.3.2 The <SCREENS> tag

The <SCREENS>...</SCREENS> pair delimits the screens definition for a specific device. The tag has one attribute;

| Attribute | Optional? | Description |
| --- | --- | --- |
| STSCRN | No | The first screen that is displayed when the application starts |

3.4.3.3 The <SCREEN> tag

The <SCREEN>...</SCREEN> pair, and its contents are described in section 5.1.3.1

APPENDIX "A": ARML Specification

3.4.4 Example
The following example shows the screen definitions section for an application that allows a user to view their inbox and the mails in it.

```
{wrapper tags}
<DEV TYPE="RIM">
        <SCREENS>
                <SCREEN NAME="INBOX ">
                        (screen definition)
                </SCREEN>
                <SCREEN NAME="VIEWNEWMAIL">
                        (screen definition)
                </SCREEN>
        </SCREENS>
</DEV>
<DEV TYPE="PALM">
        <SCREENS>
                <SCREEN NAME="INBOX">
                        (screen definition)
                </SCREEN>
                <SCREEN NAME="VIEWNEWMAIL">
                        (screen definition)
                </SCREEN>
        </SCREENS>
</DEV>
{wrapper tags}
```

4 Application-Defined Packages

This section describes the format of application defined packages.

4.1 General
This section describes the general structure of an application-specific data package. As described in section , ;

4.1.1 Description
System level packages are sent between AIRIX and the application server, and between AIRIX and the AVM

4.1.2 Structure
An application defined package has the following structure;

```
<ARML>
        <HEAD>
                (header information)
        </HEAD>
        <PKG>
                (package information)
        </PKG>
</ARML>
```

4.1.3 Tags

4.1.3.1 The <HEAD> tag

APPENDIX "A": ARML Specification

The <HEAD> tag is as described in section 7.1.3.1

4.1.3.2 The <PKG> tag

The <PKG>...</PKG> tags delimit the package data. The PKG tag has the following attributes;

| Attribute | Optional? | Description |
|---|---|---|
| TYPE | No | A text string identifying the type of package being sent |

APPENDIX "A": ARML Specification

4.2 Package information
The format and rules for application-defined data packages depend on the package definitions for that application.

4.2.1 Example
A sample data package following the rules in section 3.3.4 would have a body section like this;

```
{wrapper tags}
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
{wrapper tags}
```

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" UPDATELOCALDATA="NO"
```
Package
```
<BODY TYPE="ME">
```

The package has two sections, which correspond to the two table update sections in the package definition;

APPENDIX "A": ARML Specification

Package Definition

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
    WHERETYPE="PROP" SECTION="RECIPS" MULTIROW="YES"
    MULTIROWIDENT="RCP">
```

Package

```
<MAIL MSGID="1" FROM="Tim Neil"
<RECIPS>
    <RCP>
    <RCP>
    <RCP>
</RECIPS>
```

APPENDIX "A": ARML Specification

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition
```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
```

Package
```
<RCP MSGID="1" TO="Jeff Jones" ADDRESS="jeff@nextair.com"></RCP>
```

APPENDIX "A": ARML Specification

5 User Interface Definitions

5.1 General

5.1.1 Description
A screen definition file defines a single screen for a specific device.

5.1.2 Structure
A screen definition file has the following structure;

```
<ARML>
    <SCREEN>
            <EVENTS>
                    <EVENT>
                            <ACTION>...</ACTION>
                    </EVENT>
            </EVENTS>
            <QUERIES>
                    (menu definition)
            </QUERIES>
            <MENUS>
                    (menu definition)
            </MENUS>
            <BUTTONS>
                    (button definitions)
            </BUTTONS>
            <TEXTITEMS>
                    (textitem definitions)
            </TEXTITEMS>
            <EDITBOXES>
                    (edit box definitions)
            </EDITBOXES>
            <CHOICEITEMS>
                    (choice item definitions)
            </CHOICEITEMS>
            <IMAGES>
                    (image definitions)
            </IMAGES>
            <LISTBOXES>
                    (list box definitions)
            </LISTBOXES>
            <CHECKBOXES>
                    (check box definitions)
            </CHECKBOXES>
            <GRIDS>
                    (check grid definition)
            </GRIDS>
    </SCREEN>
</ARML>
```

5.1.3 Tags

5.1.3.1 The SCREEN tag
The <SCREEN>...</SCREEN> pair marks the start and end of the screen definitions section. It has attribute –

| Attribute | Optional? | Description |

APPENDIX "A": ARML Specification

| NAME | No | An identifier for the screen. This is used to qualify variables and navigate between screens |
|---|---|---|
| TITLE | No | The title that appears for the screen. |
| BACKGROUND | Yes | If used, an image that appears behind the interface elements |
| ORDERED | Yes, only applicable on WAP | If yes, WML is created with ORDERED property set to true, if NO, WML is created with ORDERED property set to false. Only applicable on WAP. See WML standard for definition of ORDERED. |

5.1.3.2 The <EVENTS> tag

The <EVENT>...</EVENT> pair marks the start and end of a user-interface level event definition. See section 6 for a detailed discussion of the Smart Client event model.

5.1.3.3 The <EVENT> tag

The <EVENT>...</EVENT> pair marks the start and end of a user-interface level event definition. See section 6 for a detailed discussion of the Smart Client event model.

5.1.3.4 The <ACTION> tag

The <ACTION>...</ACTION> pair marks the start and end of an action definition. See section 6 for a detailed discussion of the Smart Client event model.

5.1.3.5 The QUERIES tag

The <QUERIES>...</QUERIES> pair marks the start and end of the queries definitions section. It has no attributes.

5.1.3.6 The MENUS tag

The <MENUS>...</MENUS> pair marks the start and end of the menu definition section. It has no attributes.

5.1.3.7 The BUTTONS tag

The <BUTTONS>...</BUTTONS> pair marks the start and end of the button definitions section. It has no attributes.

5.1.3.8 The TEXTITEMS tag

The <TEXTITEMS>...</TEXTITEMS> pair marks the start and end of the text items section. It has no attributes.

5.1.3.9 The EDITBOXES tag

The <EDITBOXES>...</EDITBOXES> pair marks the start and end of the editboxes section. It has no attributes.

5.1.3.10 The CHOICEITEMS tag

The <CHOICEITEMS>...</CHOICEITEMS> pair marks the start and end of the choiceitems section. It has no attributes.

5.1.3.11 The IMAGES tag

The <IMAGES>...</IMAGES> pair marks the start and end of the images section. It has no attributes.

5.1.3.12 The CHECKBOXES tag

The <CHECKBOXES>...</CHECKBOXES> pair marks the start and end of the

APPENDIX "A": ARML Specification checkboxes section. It has no attributes.

5.1.3.13 The LISTBOXES tag

The <LISTBOXES>...</LISTBOXES> pair marks the start and end of the listboxes section. It has no attributes.

5.1.3.14 The GRIDS tag

The <GRIDS>...</GRIDS> pair marks the start and end of the grids section. It has no attributes.

5.2 Queries definition section

5.2.1 Description

The queries definition section describes any queries that need to be run to populate a screen.

5.2.2 Structure

The queries definition section has the following structure;

```
{wrapper tags}
<QUERIES>
      <QUERY>
            <W>...</W>
      </QUERY>
</QUERIES>
{wrapper tags}
```

5.2.3 Tags

5.2.3.1 The <QUERIES> tag

The <QUERIES> ... </QUERIES> pair marks the start and end of query definition section. It has no attributes.

5.2.3.2 The <QUERY> tag

The <QUERY>...</QUERY> pair marks the start and end of a given query. It has the following attributes;

| Attribute | Optional? | Description |
|---|---|---|
| NAME | No | Name of the query. |
| TABLE | No | The table in the database that is updated |
| ORDERBY | Yes | Specifies the name of the field in the table that the results are to be ordered on. |
| ORDERDIR | Yes | ASC or DESC, sort ascending or descending respectively. If ORDERBY is present and ORDERDIR is not, ASC is assumed. |

5.2.3.3 The <W> tag

The <W>...</W> pair marks the start and end of a given where clause. The value of the parameter is contained within the <W>...</W> tags. This value can be a specific value or a reference to a user interface field in the format "[SP.screen.savename] or [QU.query.field]". It has the following attributes;

| Attribute | Optional? | Description |
|---|---|---|

APPENDIX "A": ARML Specification

| F | No | Specifies the field to match on. |
|---|---|---|
| E | No | Specifies the expression type. Available expression types include:<br>EQ<br>NE<br>LT<br>GT<br>BW (applicable only to fields of type STRING) |

5.3 Menu definition section

5.3.1 Description

The menu definition section describes the menu for a given screen.

5.3.2 Structure

The menu definition section has the following structure;

```
{wrapper tags}

<MENUS>
  <MENU>
      <MENUITEM>
            <EVENTS>
                  <EVENT>
                        <ACTION>...</ACTION>
                  </EVENT>
            </EVENTS>
      </MENUITEM>
  </MENU>
</MENUS>
{wrapper tags}
```

5.3.3 Tags

5.3.3.1 The <MENUS> tag

The <MENUS> ... </MENUS> pair marks the start and end of menu definition section. It has no attributes.

5.3.3.2 The <MENU> tag

The <MENU> ... </MENU> pair marks the start and end of a menu definition. It has the following attributes.

| Attribute | Optional? | Description |
|---|---|---|
| NAME | No | An internal identifier for the menu |
| CAPTION | No | The text that appears for this item in the menu |

5.3.3.3 The <MENUITEM> tag

The <MENUITEM>...</MENUITEM> pair marks the start and end of a menuitem definition. It has the following tags;

| Attribute | Optional? | Description |
|---|---|---|
| NAME | No | An internal identifier for the menu |
| CAPTION | No | The text that appears for this item in the menu |
| INDEX | Yes | The index of this menu item with respect to all of the menu items on this menu. |
| READONLY | Yes | If True, the menu item is inactive. False is the default. |

APPENDIX "A": ARML Specification

5.3.3.4 The <EVENTS> tag

The <EVENT>...</EVENT> pair marks the start and end of a user-interface level event definition. See section 6 for a detailed discussion of the Smart Client event model.

5.3.3.5 The <EVENT> tag

The <EVENT>...</EVENT> pair marks the start and end of a user-interface level event definition. See section 6 for a detailed discussion of the Smart Client event model.

5.3.3.6 The <ACTION> tag

The <ACTION>...</ACTION> pair marks the start and end of an action definition. See section 6 for a detailed discussion of the Smart Client event model.

5.4 Buttons definition section
5.4.1 Description

The buttons definition section describes the buttons that appear on a given screen.

5.4.2 Structure

The buttons definition section has the following structure;

```
{wrapper tags}
<BTN>
        <EVENTS>
                <EVENT>
                        <ACTION>...</ACTION>
                </EVENT>
        </EVENTS>
</BTN>
{wrapper tags}
```

5.4.3 Tags

5.4.3.1 The BTN tag

The <BTN>...</BTN> pair marks the start and end of a button definition. It has one attribute –

| Attribute | Optional? | Description |
|---|---|---|
| NAME | No | An identifier for the button. |
| INDEX | No | The order in which the button appears |
| CAPTION | No | The caption that appears on a given button |
| X | Yes | The X-coordinate of the button on the screen. This attribute may not be meaningful in some display environments, in which case it would be skipped without processing by the parser |
| Y | Yes | The Y-coordinate of the button on the screen. This attribute may not be meaningful in some display environments, in which case it would be skipped without processing by the parser |
| HT | Yes | This is the Height of the button. This attribute may not be meaningful in some display environments, in which case it would be skipped without processing by the parser |
| WT | Yes | This is the Width of the Button. This attribute may not be meaningful in some display environments, in which case it would be skipped without processing by the parser |
| READONLY | Yes | If True, the button is not enabled. False is the default. |

5.4.3.2 The <EVENTS> tag

APPENDIX "A": ARML Specification

The <EVENT>...</EVENT> pair marks the start and end of a user-interface level event definition. See section 6 for a detailed discussion of the Smart Client event model.

5.4.3.3 The <EVENT> tag

The <EVENT>...</EVENT> pair marks the start and end of a user-interface level event definition. See section 6 for a detailed discussion of the Smart Client event model.

5.4.3.4 The <ACTION> tag

The <ACTION>...</ACTION> pair marks the start and end of an action definition. See section 6 for a detailed discussion of the Smart Client event model.

5.5 Text Items definition section

5.5.1 Description

The text items definition

5.5.2 Structure

The text items section has the following structure;

```
{wrapper tags}
<TI>
      <EVENTS>
            <EVENT>
                  <ACTION>...</ACTION>
            </EVENT>
      </EVENTS>
</TI>
{wrapper tags}
```

5.5.3 Tags

5.5.3.1 The TI tag

The <TI>...</TI> pair marks the start and end of the screen definitions section. It has attribute –

| Attribute | Optional? | Description |
|---|---|---|
| INDEX | No | The order in which the text item appears |
| NAME | No | An Identifier for the Text Item |
| CAPTION | No | Text to appear on the Text Item |
| X | Yes | The X-coordinate of the text item on the screen. This attribute may not be meaningful in some display environments, in which case it would be skipped without processing by the parser |
| Y | Yes | The Y-coordinate of the text item on the screen. This attribute may not be meaningful in some display environments, in which case it would be skipped without processing by the parser |
| HT | Yes | This is the Height of the Text Item. This attribute may not be meaningful in some display environments, in which case it would be skipped without processing by the parser |
| WT | Yes | This is the Width of the Text Item. This attribute may not be meaningful in some display environments, in which case it would be skipped without processing by the parser |

5.5.3.2 The <EVENTS> tag

The <EVENT>...</EVENT> pair marks the start and end of a user-interface level event definitio-n. See section 6 for a detailed discussion of the Smart Client event model.

APPENDIX "A": ARML Specification

5.5.3.3 The <EVENT> tag
The <EVENT>...</EVENT> pair marks the start and end of a user-interface level event definition. See section 6 for a detailed discussion of the Smart Client event model.

5.5.3.4 The <ACTION> tag
The <ACTION>...</ACTION> pair marks the start and end of an action definition. See section 6 for a detailed discussion of the Smart Client event model.

5.6 Edit boxes definition section
5.6.1 Description
The edit boxes definition section describes what edit boxes exist for the screen.

5.6.2 Structure
The edit boxes section has the following structure;

```
{wrapper tags}
<EB>
        <EVENTS>
                <EVENT>
                        <ACTION>...</ACTION>
                </EVENT>
        </EVENTS>
</EB>
{wrapper tags}
```

5.6.3 Tags

5.6.3.1 The EB tag
The <EB>...</EB> pair marks an edit box definition. It has the following attributes –

| Attribute | Optional? | Description |
|---|---|---|
| NAME | No | An identifier for the edit box. |
| TEXT | No | The text to display in the edit box before any entry has been made. Only used if the DATASRC attribute is invalid or omitted. Can be a scratchpad or query value of the form [SP.screen.savename] or [QU.query.field]. |
| INDEX | No | The order in which the edit box appears |
| CAPTION | No | The caption for on a given edit box. |
| MULTILINE | No | Boolean field that indicates whether the edit box is a multiline field. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |

APPENDIX "A": ARML Specification

| HT | Yes | The Height of the Edit Box. This attribute may not be meaningful in some display environments, in which case it would be skipped without processing by the parser |
|---|---|---|
| WT | Yes | The Width of the Edit Box. This attribute may not be meaningful in some display environments, in which case it would be skipped without processing by the parser |
| FT | Yes | Specifies the type of value expected (INT, STRING, MEMO,DATETIME) for the VM to validate prior to continuing a Save. If omitted, STRING is the default data type. |
| DATASRC | Yes | If present, the query and field in the query that populates this edit box. This is given in the format "query.field". |
| READONLY | Yes | If "TRUE" the edit box will be read only, otherwise it is editable. "FALSE is the default value. |

5.6.3.2 The <EVENTS> tag

The <EVENT>...</EVENT> pair marks the start and end of a user-interface level event definition. See section 6 for a detailed discussion of the Smart Client event model.

5.6.3.3 The <EVENT> tag

The <EVENT>...</EVENT> pair marks the start and end of a user-interface level event definition. See section 6 for a detailed discussion of the Smart Client event model.

5.6.3.4 The <ACTION> tag

The <ACTION>...</ACTION> pair marks the start and end of an action definition. See section 6 for a detailed discussion of the Smart Client event model.

5.7 Choice items definition section

5.7.1 Description

The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

5.7.2 Structure

The choice items section has the following structure;

```
{wrapper tags}
<CHOICE>
        <EVENTS>
                <EVENT>
                        <ACTION>...</ACTION>
                </EVENT>
        </EVENTS>
        <ITEMS>
                <I>...</I>
        </ITEMS>
</CHOICE>
{wrapper tags}
```

5.7.3 Tags

5.7.3.1 The <CHOICE> tag

The <CHOICE>...</CHOICE> pair marks the start and end of a choice item definition. It has these attributes –

APPENDIX "A": ARML Specification

| Attribute | Optional? | Description |
|---|---|---|
| NAME | No | An identifier for the choice item. |
| TEXT | No | The text to display in the choice item before any selection has been made. |
| INDEX | No | The order in which the choice item appears |
| CAPTION | No | The caption that appears for a given choice item |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the query and field in the query that populates this choice item. This is given in the format "query.field". |
| IDDATASRC | Yes | If present, the query and field in the query that populates the Ids for this choice item. This is given in the format "query.field". The ID values created by the attributes should correspond directly to the choice item values. I.e. they should create a value, id pair. |
| READONLY | Yes | If "True", the control cannot be modified. "False" is the default. |
| SI | Yes | The value to indicate which item of the choice item is to be selected when loaded. This value will be compared with the ID property (hard-coded items) or the IDDATASRC property (database items). |

5.7.3.2 The <ITEMS> tag

The <ITEMS>...</ITEMS> pair marks the start and end of a list of items to be included in the in the choice item. If a datasrc is specified, the <ITEMS> section is ignored.

5.7.3.3 The <I> tag

The <I>...</I> pair marks the start and end of an individual item in the choice items list. It has the following attributes:

| Attribute | Optional? | Description |
|---|---|---|
| ID | Yes | An id used to identify this item in the list. |

The value between the pair is the text value that is to be displayed in the choice item.

5.7.3.4 The <EVENTS> tag

The <EVENT>...</EVENT> pair marks the start and end of a user-interface level event definition. See section 6 for a detailed discussion of the Smart Client event model.

5.7.3.5 The <EVENT> tag

The <EVENT>...</EVENT> pair marks the start and end of a user-interface level event definition. See section 6 for a detailed discussion of the Smart Client event model.

5.7.3.6 The <ACTION> tag

The <ACTION>...</ACTION> pair marks the start and end of an action definition. See section 6 for a detailed discussion of the Smart Client event model.

APPENDIX "A": ARML Specification

5.8 Checkboxes definition section

5.8.1 Description
The checkboxes section describes a check box that appears on a given screen.

5.8.2 Structure
The checkboxes section has the following structure;

```
{wrapper tags}
      <CHK>
            <EVENTS>
                  <EVENT>
                        <ACTION>...</ACTION>
                  </EVENT>
            </EVENTS>
      </CHK>
{wrapper tags}
```

5.8.3 Tags

5.8.3.1 The CHK tag
The <CHK>...</CHK> pair marks a check box definition

| Attribute | Optional? | Description |
|---|---|---|
| NAME | No | An identifier for the check box. |
| INDEX | No | The index of this control with respect to the list of all controls on the screen. |
| CAPTION | No | The text to be displayed for this check box if the DATASRC is not available or is not specified. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| HT | Yes | The Height of the Checkbox. This attribute may not be meaningful in some display environments, in which case it would be skipped without processing by the parser |
| WT | Yes | The Width of the Checkbox. This attribute may not be meaningful in some display environments, in which case it would be skipped without processing by the parser |
| DATASRC | Yes | If present, the query and field in the query that populates this check box. This is given in the format "query.field". |
| VALUE | Yes | If present, specifies the initial state of the check box ('TRUE' = checked, 'FALSE' = Unchecked. If unspecified, FALSE is the default value. |
| READONLY | Yes | If "TRUE" the check box cannot be modified. "FALSE" is the default value. |

5.8.3.2 The <EVENTS> tag
The <EVENT>...</EVENT> pair marks the start and end of a user-interface level event definition. See section 6 for a detailed discussion of the Smart Client event model.

5.8.3.3 The <EVENT> tag

APPENDIX "A": ARML Specification

The <EVENT>...</EVENT> pair marks the start and end of a user-interface level event definition. See section 6 for a detailed discussion of the Smart Client event model.

5.8.3.4 The <ACTION> tag

The <ACTION>...</ACTION> pair marks the start and end of an action definition. See section 6 for a detailed discussion of the Smart Client event model.

5.9 Listboxes definition section

5.9.1 Description

The listboxes section describes a list box that appears on a given screen.

5.9.2 Structure

The listboxes section has the following structure;

```
{wrapper tags}
      <LB>
            <EVENTS>
                  <EVENT>
                        <ACTION> ... </ACTION>
                  </EVENT>
            </EVENTS>
            <ITEMS>
                  <I> ... </I>
            </ITEMS>
      </LB>
{wrapper tags}
```

5.9.3 Tags

5.9.3.1 The LB tag

The <LB>...</LB> pair marks a list box definition

| Attribute | Optional? | Description |
|---|---|---|
| NAME | No | An identifier for the list box. |
| INDEX | No | The index of this control with respect to all of the controls on the screen. |
| CAPTION | No | The text to be displayed as the title of this list box, where applicable. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the list box on the screen. This attribute may not be meaningful in some display environments, in which case it would be skipped without processing by the parser |
| Y | Yes | The Y-coordinate of the list box on the screen. This attribute may not be meaningful in some display environments, in which case it would be skipped without processing by the parser |
| HT | Yes | The Height of the Listbox. This attribute may not be meaningful in some display environments, in which case it would be skipped without processing by the parser |
| WT | Yes | The Width of the Listbox. This attribute may not be meaningful in some display environments, in which case it would be skipped without processing by the parser |
| DATASRC | Yes | If present, the query and field in the query that populates this list box. This is given in the format "query.field". |

APPENDIX "A": ARML Specification

| IDDATASRC | Yes | If present, the query and field in the query that populates the list box Ids. This is given in the format "query.field". This value will create a list of ID values that correspond to the list box values in DATASRC. I.e. they should create a value, id pair. |
|---|---|---|
| READONLY | Yes | If "TRUE" the list box cannot be modified. "FALSE" is the default. |
| SI | Yes | The value to indicate which item of the choice item is to be selected when loaded. This value will be compared with the ID property (hard-coded items) or the IDDATASRC property (database items). |

5.9.3.2 The <ITEMS> tag

The <ITEMS>...</ITEMS> pair marks the start and end of a list of items to be included in the in the list box. If a datasrc is specified, the <ITEMS> section is ignored.

5.9.3.3 The <I> tag

The <I>...</I> pair marks the start and end of an individual item in the list box items list. It has the following attributes:

| Attribute | Optional? | Description |
|---|---|---|
| ID | Yes | An id used to identify this item in the list. |

The value between the pair is the text value that is to be displayed in the list box. Can be a scratchpad or query value of the form [SP.screen.savename] or [QU.query.field].

5.9.3.4 The <EVENTS> tag

The <EVENT>...</EVENT> pair marks the start and end of a user-interface level event definition. See section 6 for a detailed discussion of the Smart Client event model.

5.9.3.5 The <EVENT> tag

The <EVENT>...</EVENT> pair marks the start and end of a user-interface level event definition. See section 6 for a detailed discussion of the Smart Client event model.

5.9.3.6 The <ACTION> tag

The <ACTION>...</ACTION> pair marks the start and end of an action definition. See section 6 for a detailed discussion of the Smart Client event model.

5.10 Grids

5.10.1 Description

Grids allow data to be displayed in row-column format. Grids can display data from a data source (query) or they can contain hard coded values. Each column in a grid can be visible or hidden. Hidden values are maintained, but not visible to the user.

5.10.2 Structure

The grids section has the following structure;

```
{wrapper tags}
    <GRID>
        <COLS>
            <COL> ... </COL>
        </COLS>
        <ROWS>
            <R>
```

APPENDIX "A": ARML Specification

```
                <V> ... </V>
            </R>
        </ROWS>
    </GRID>
{wrapper tags}
```

5.10.3 Tags

5.10.3.1 GRID Tag

<GRID>...</GRID> The grid item itself will have the following attributes

| Attribute | Optional? | Description |
|---|---|---|
| NAME | No | An identifier for the edit box. |
| INDEX | No | The order in which the edit box appears |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| GRDSRC | Yes | This is the Query on the screen that will provide the data to the grid. No field name will be specified in this value |

5.10.3.2 COLS Tag

<COLS>...</COLS> This tag contains no attributes. But instead contains all the columns that are associated with the grid in the order in which they appear from left to right.

5.10.3.3 COL Tag

<COL>...</COL> This tag will determine the column specification for the grid. The attributes for this item are the following:

| Attribute | Optional? | Description |
|---|---|---|
| CAPTION | Yes | This is the caption that appears at the top of the grid where applicable. |
| FIELDNAME | Yes | This field name represents the Field to pull information from out of the GRDSRC of the grid control. |
| SAVE | No | This true false value will be checked when the SAVE action is called to save values to the scratchpad |
| SAVENAME | Yes | This is the name in which the data will be saved when the SAVE action is called and the column is marked for Saving |
| WT | Yes | The Width of the Edit Box. This attribute may not be meaningful in some display environments, in which case it would be skipped without processing by the parser |

5.10.3.4 ROWS Tag

<ROWS>...</ROWS> This will Indicate any hard coded rows that would be created in the design studio. It does not contain any attributes but instead contains all the row definitions.

APPENDIX "A": ARML Specification

5.10.3.5 R Tag

<R>...</R> This is the row declaration that contains all the values for the row that has been hard coded. It has no attributes itself, but contains the value definitions for the row.

5.10.3.6 V Tag

<V>...</V> This definition contains the data that is related to the ROW and to the column.

5.10.4 Example

An example of a grid declaration is as follows:

```
<GRID INDEX="2" NAME="mygrid" X="10" Y="50" HT="100" WT="100" GRDSRC="QUERY1">
<COLS>
<COL CAPTION="Id" FIELDNAME="lngID" SAVE="TRUE" SAVENAME="lngID" WT="20"></COL>
<COL CAPTION="Subject" FIELDNAME="strSubject" SAVE="TRUE" SAVENAME="Sub" WT="80"></COL>
</COLS>
<ROWS>
  <R>
    <V>343432</V>
    <V>This is a subject</V>
  </R>
  <R>
    <V>5456</V>
    <V>This is another subject</V>
  </R>
</ROWS>
</GRID>
```

6 The Smart Client Event Model

The Smart Client has a set of actions that it ties to events. Events can occur at the application level, the screen level or the user interface item level; an application level event is listened for throughout the operation of the application, a screen level event is listened for while the screen is displayed, and so on. If an action for an event is defined at multiple levels, the lowest level has precedence; i.e., user interface actions override screen level actions, which override application level actions. An attempt to list an event multiple times at the same level (application, screen, item) is invalid and will generate an error message. The following ARML fragment illustrates this schema (tags and attributes not relevant to the event model have been omitted);

```
<AXTSCHDEF>
    <EVENTS>
        <EVENT>
            <ACTION>...</ACTION>
            <ACTION>...</ACTION>
            <EVENTS>
            <EVENT>
            <ACTION>...</ACTION>
            </EVENT>
    </EVENTS>
    <INTERFACE>
        <SCREEN>
            <EVENT>
                <ACTION>...</ACTION>
            </EVENT>
            <EVENT>
                <ACTION>...</ACTION>
            </EVENT>
```

APPENDIX "A": ARML Specification

```
<BUTTON>
    <EVENT>
        <ACTION>...</ACTION>
    </EVENT>
    <EVENT>
        <ACTION>...</ACTION>
    </EVENT>
</BUTTON>
</SCREEN>
</INTERFACE>
</AXTSCHDEF>
```

6.1 The EVENTS tag

The <EVENTS>...</EVENTS> pair marks the start and end of the events section. It has no attributes.

6.2 The EVENT tag

The <EVENT>...</EVENT> pair marks the start and end of an event definition. It has the following attributes;

| Attribute | Optional? | Description |
|---|---|---|
| TYPE | No | The type of event that should be performed when the button is pushed. Allowed values are;<br>BUTTONCLICK<br>MENUITEMSELECTED<br>DATA |

6.2.1 The BUTTONCLICK event

The button click event occurs when the user selects a button. It has no attributes.

6.2.2 The MENUITEMSELECTED event

The menu items selected event occurs when the user selects a menu item. It has no attributes.

6.2.3 The DATA event

The data event occurs when ARML data is received from the wireless interface. It has the following attributes;

| Attribute | Optional? | Description |
|---|---|---|
| NAME | No | The identifier of the specific package |

6.3 The ACTION tag

The <ACTION>...</ACTION> pair marks the start and end of an event definition. It has one fixed attribute, and a number of attributes that may or may not appear depending on the type of action required. The fixed attribute is;

| Attribute | Optional? | Description |
|---|---|---|

APPENDIX "A": ARML Specification

| TYPE | No | The type of action that should be performed when the button is pushed. Allowed values are; OPEN ARML SAVE PURGE NOTIFY CLOSE ALERT IF...Then...Else CLOSESCREEN REFRESH SAVEITEM |
|---|---|---|

6.3.1 The OPEN action

The open action tells the Smart Client to open a new screen. It adds one extra attribute to the ACTION tag;

| Attribute | Optional? | Description |
|---|---|---|
| NAME | No | The name of the screen to open |
| NEWINST | Yes | If true, a new instance of the screen is created. If false, the least recently used instance of the screen is opened and the data is not refreshed. True is the default. |

6.3.2 The ARML action

The arml action tells the Smart Client to compose and send an arml package. It does not add any attributes to the ACTION tag, but has the following subtag;

<ARMLTEXT>

Contained between the <ARMLTEXT>...</ARMLTEXT> pair is one of the application-defined data packages. Individual data items are marked with the user interface item that their value should be taken from, in the format "[SP.*screen.savename*]", or [QU.*query.field*]. If *screen* is not the current screen, then the Smart Client will look for the data in its scratchpad. See section 0 for an example of the ARML action.

6.3.3 The SAVE action

The save action tells the Smart Client to save all fields marked as persistent (i.e., they are defined with SAVE="Yes") to be saved to the scratchpad area. It has no attributes.

6.3.4 The PURGE action

The purge action tells the Smart Client to clear all fields that have been saved to the scratchpad. It has no attributes.

6.3.5 The NOTIFY action

The notify action tells the Smart Client to activate the configured notification on a device. For devices where this has no meaning, it will cause a beep to be played. It has no attributes.

6.3.6 The CLOSE action

The close action tells the Smart Client to close the application. It has no attributes.

6.3.7 The ALERT action

The alert action tells the Smart Client to display an alert item (e.g., a message box on

APPENDIX "A": ARML Specification

Windows, an alert box on the RIM pager, an alert card on WAP). It has the following attributes;

| Attribute | Optional? | Description |
|---|---|---|
| CAPTION | Yes | The caption to display in the title bar of the message box |
| TEXT | Yes | The text to display in the message box |

6.3.8 The INTEGRATION action

The integration action tells the Smart Client to pass data to an interface exposed on a device. For example a COM interface on Pocket PC. This action will allow the developer to pass a parameter into an exposed method and then also save the result of that method in a global scratchpad value. The contents of the integration action's element are the input values to be passed to the interface. It has the following attributes;

| Attribute | Optional? | Description |
|---|---|---|
| CLSID | No | This is the class identifier of the component that is to be called. |
| SAVE | No | This tells the smart client if it should save the result into a global scratchpad value or not. |
| SAVENAME | Yes | This is the name of the global scratchpad value |

Example ARML:

<ACTION TYPE="*INTEGRATION*" CLSID="*AirixSignature.AirixSignatureCtrl*" SAVENAME="" SAVE="*FALSE*">*[SP.\*.SIGNATURE]*</ACTION>

6.3.9 The CLOSESCREEN action

The close screen action tells the Smart Client to close all open instances of the screen specified by name in the NAME attribute. This action has the following attributes:

| Attribute | Optional? | Description |
|---|---|---|
| NAME | No | Name of the screen to close. |

6.3.10 The REFRESH action

The refresh action tells the Smart Client to re-run any queries and re-initialize all UI elements on the screen with the name specified by the NAME attribute. If there are multiple open instances of the screen, all open instances will be refreshed. The refresh action has the following attributes:

| Attribute | Optional? | Description |
|---|---|---|
| NAME | No | Name of the screen to refresh. |

6.3.11 The SAVEITEM action

The saveitem action tells the Smart Client to create a new scratchpad item or to edit an existing scratchpad item. The value of the scratchpad item is defined within the <ACTION>...</ACTION> tags. The saveitem action has the following attributes:

| Attribute | Optional? | Description |
|---|---|---|
| SPN | No | Name of the scratchpad item to create or modify. |

6.3.12 The IF Action

APPENDIX "A": ARML Specification

This action will contain two lists of actions. One a list of actions to perform if the condition evaluates to TRUE (IFLIST), and another list of actions to perform if the condition evaluates to FALSE (ELSEIFLIST).

The structure of the action is as follows:
```
<ACTION TYPE="IF">
    <COND EVAL="parameter" TYPE="condition type" VALUE="literal">
    </COND>
    <IFLIST>
        <ACTION></ACTION>
    </IFLIST>
    <ELSEIFLIST>
        <ACTION></ACTION>
    </ELSEIFLIST>
</ACTION>
```

6.3.12.1 Conditions (COND)

Conditions are used in conjunction with the IF Action. Conditions are specified as follows:

| Attribute | Optional? | Description |
|---|---|---|
| EVAL | NO | Specifies the parameter to be evaluated. Can be hard coded, scratchpad, or query values. It is the "input" to the function. |
| TYPE | NO | Specifies the type of the condition. Possible values are: LESSTHAN MORETHAN EQUALS ISNUMERIC ISALPHA ISEMAIL ISFORMAT MAXCHARS MINCHARS |
| VALUE | Depends on TYPE | The value that EVAL will be evaluated against. Not relevant for all conditions. |

The following is a description of each of the supported conditions:
- EQUALS, this function will take an input and a value to evaluate the input against. If the two items are determined to be Equal, the condition will return true. If they are not equal, the condition will return false. The value and the input must be of the same data type, otherwise the condition will return false. Memo values will be treated as a string and auto-increment types will be treated as integers. The following criteria will be used to determine equality:
    o Two strings are equal if each of the characters in the strings is identical and the strings have the same number of characters. The string comparison will not be case sensitive.
    o Two integers are equal if their values are mathematically equal.
- MORETHAN, this function will take an input and a value to evaluate the input against. If the input is determined to be greater in value than the evaluation value, the condition will return true. If the values are equal, false is returned. If the evaluation value is determined to be greater than the input, the function will return false. The evaluation value and the input must be of the same data type, otherwise an error condition will occur. Memo values will be treated as a string and the auto-increment type will be treated as an integer. The following criteria will be used to

APPENDIX "A": ARML Specification determine which value is greater:
- String A is more in value than String B if String A occurs before String B in alphabetical order.
- Integer A is greater than Integer B if A > B, mathematically.

- LESSTHAN, this function will take an input and a value to evaluate the input against. If the input is determined to be lesser in value than the evaluation value, the condition will return true. If the values are equal, false is returned. If the evaluation value is determined to be lesser than the input, the function will return false. The evaluation value and the input must be of the same data type, otherwise an error condition will occur. Memo values will be treated as a string and the auto-increment type will be treated as an integer. The following criteria will be used to determine which value is greater:
  - String A is lesser in value than String B if String A occurs after String B in alphabetical order.
  - Integer A is greater than Integer B if A < B, mathematically.
- ISNUMERIC, this function will take an input and evaluate whether or not it is a value number. If the input can be converted successfully to a number, the function will return true. If the input cannot be converted to a number, the function will return false. All input values will be treated as a string data type.
- ISALPHA, this function will take an input and evaluate whether or not it contains only alphabetic characters. Alphabetic characters are defined as all characters from A-Z, a-z,, and spaces. All input values will be treated as a string data type.
- ISEMAIL, this function will take an input and evaluate whether or not it contains a string of the form *something@something*. All input values will be treated as a string data type.
- ISFORMAT, this function will take an input and a value to evaluate the input against. If the input is determined to be formatted as the evaluation value, the condition will return true. If the evaluation value is determined to be formatted differently than the input, the function will return false. The evaluation value must comply with the ARML formatting standards.
- MAXCHARS, this function will take an input and evaluate whether or not the number of characters in the string is less than or equal to the evaluation value passed into the function. If the number of characters in the string is less than or equal to the evaluation value, true is returned. If the number of characters in the string is greater than the evaluation value, false is returned. All input values will be treated as a string data type.
- MINCHARS, this function will take an input and evaluate whether or not the number of characters in the string is greater than or equal to the evaluation value passed into the function. If the number of characters in the string is greater than or equal to the evaluation value, true is returned. If the number of characters in the string is less than the evaluation value, false is returned. All input values will be treated as a string data type.

Example:
```
<ACTION TYPE="IF">
    <COND EVAL="[QUERY1.STRREAD]" TYPE="EQUALS" VALUE="READ"></COND>
    <IFLIST>
        <ACTION TYPE="SAVE"></ACTION>
        <ACTION TYPE="OPEN" NAME="INBOX" NEWINST="FALSE"></ACTION>
    </IFLIST>
```

APPENDIX "A": ARML Specification

```
    <ELSELIST>
        <ACTION TYPE="OPEN" NAME="MSGREAD" NEWINST="FALSE"></ACTION>
    </ELSELIST>
</ACTION>
```

Example of airix event model

The following example serves to illustrate how a screen is used to compose a data package to be sent back to the AIRIX server. The example used is a screen giving the bare functionality for composing a basic email message – to simplify the example, the user cannot cancel the action, and multiple recipients are not allowed.

```
<ARML>
    <SCREEN NAME="NewMsg">
        <BUTTONS>
            <BTN NAME="OK" CAPTION="Send" INDEX="0">
                <EVENTS>
                    <EVENT TYPE="MODIFY">
                        <ACTION TYPE="ARML">
                            <ARMLTEXT>
                                <BODY TYPE="ME">
                                    <ME MSGID="1" FROM="Tim Neil"
                                        SUBJECT="[SP.NewMsg.Subject]">
                                        <DATA>[SP.NewMsg.Body]</DATA>
                                        <RECIPS>
                                            <RCP MSGID="1"
                                                TO="[SP.NewMsg.To]"></RCP>
                                        </RECIPS>
                                    </ME>
                                </BODY>
                            </ARMLTEXT>
                        </ACTION>
                    </EVENT>
                </EVENTS>
            </BTN>
        </BUTTONS>
        <EDITBOXES>
            <EB NAME="To" INDEX="1"></EB>
            <EB NAME="Subject" INDEX="2"></EB>
            <EB NAME="Body" INDEX="3"></EB>
        </EDITBOXES>
    </SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

There is one button on the screen, with the name of 'OK';

```
<BTN NAME="OK" CAPTION="Send" INDEX="0">
```

When the user clicks on OK, the button composes an ARML package to be sent to the AIRIX server;

APPENDIX "A": ARML Specification

```
<EVENT>
    <ACTION TYPE="ARML">
```

The ARML package sent is an 'ME' package as described in the example in section 4.2.1. It is composed as follows;

```
<BODY TYPE="ME">
    <ME MSGID="1" FROM="Tim Neil"
        SUBJECT="[SP.NewMsg.Subject]">
        <DATA>[SP.NewMsg.Body]</DATA>
        <RECIPS>
            <RCP MSGID="1" TO="[SP.NewMsg.To]"></RCP>
        </RECIPS>
    </ME>
</BODY>
```

The subject field is taken from the edit box named 'Subject';

```
<ME MSGID="1" FROM="Tim Neil" SUBJECT="[SP.NewMsg.Subject]">
```

The recipients field is taken from the edit box named 'Subject';

```
<RECIPS>
    <RCP MSGID="1" TO="[SP.NewMsg.To]"></RCP>
</RECIPS>
```

Finally the text of the message is filled from the 'Body' field;

```
<DATA>[SP.NewMsg.Body]</DATA>
```

7 AVM-server system interactions

This section describes the primitives that are used for system-level interactions that the AIRIX Smart Client has with the AIRIX server.

7.1 General

7.1.1 Description
System level packages are sent between AIRIX and the AVM (wirelessly).

7.1.2 Structure
System interactions are performed by exchanging ARML data packages with the following structure;

```
<ARML>
<HEAD>...</HEAD>
<SYS>
{data}
</SYS>
</ARML>
```

7.1.3 Tags

7.1.3.1 The <HEAD> tag

APPENDIX "A": ARML Specification

The package header is delimited by the <HEAD>...</HEAD> tags. Contained in text between the two tags is the id of the destination mobile. The HEAD tag has the following attributes;

| Attribute | Optional? | Description |
|---|---|---|
| DT | No | The date & time in RFC 1123 format (including time zone) |
| ID | No | A unique ID for the message |
| VERSION | No | The version number of the application (currently "2.0") |
| APPNAME | No | The application name ("0" for System Messages) |
| DEVICE | No | A numeric constant identifying the device |
| PID | Yes | A unique value used to designate a device. |
| AVMV | No | The version number of the Smart Client. |

7.1.3.2 The <SYS> tag

The <SYS>...</SYS> pair contains the actual system package. The tag does not have any attributes.

APPENDIX "A": ARML Specification

7.2 Device Registration & deregistration package

7.2.1 Description

Device registration packages are sent from the AVM to the AIRIX server when a user registers their device.

7.2.2 Structure

A device registration package has the following structure;

```
{wrapper tags}
<REG>
     <USERNAME> {data} </USERNAME>
     <PASSWORD> {data} </PASSWORD>
</REG>
{wrapper tags}
```

7.2.3 Tags

7.2.3.1 The <REG> tag

The <REG>...</REG> pair delimit the registration request. The tag has no attributes.

7.2.3.2 The <USERNAME> tag

The <USERNAME>...</ USERNAME > pair contain the user name. The tag does not have any attributes.

7.2.3.3 The <PASSWORD> tag

The <PASSWORD>...</PASSWORD> pair contain the password. The tag does not have any attributes.

7.2.4 Example

This package would be sent by a user, to register their device under a given name;

```
{wrapper tags}
<REG>
     <USERNAME>SUNTRESS</USERNAME>
     <PASSWORD>MYPASS</PASSWORD>
</REG>
{wrapper tags}
```

APPENDIX "A": ARML Specification

7.3 Registration confirmation package

7.3.1 Description

This packages is sent back from the AIRIX server to the AVM to confirm that the device has been registered.

7.3.2 Structure

A registration confirmation package has the following structure;

```
{wrapper tags}
<REGCONFIRM>
        <VALUE> {data} </VALUE>
        <APPS>
                <APP></APP>
                <APP></APP>
        </APPS>
</REGCONFIRM>
{wrapper tags}
```

7.3.3 Tags

7.3.3.1 The <REGCONFIRM> tag

The <REGCONFIRM>...</REGCONFIRM> pair delimit the confirmation. The tag has no attributes.

7.3.3.2 The <VALUE> tag

The <VALUE>...</VALUE> pair contains the status of the registration request. The following text strings are allowable;

CONFIRM – this means that the registration request was successful
NOTREGPLATFORM – this means that the registration request failed because the device is not registered for the platform
INVALIDUSERPASS – this means that the registration request failed because the user name or password was not valid
NODEVICE – this means that the registration request failed because the device was not registered previously by an application

7.3.3.3 The <APPS> tag

The <APPS>...</APPS> pair contains a list of applications for the device.

7.3.3.4 The <APP> tag

The <APP>...</APP> pair contains an application header. It has the following attributes;

| Attribute | Optional? | Description |
|---|---|---|
| ID | No | The application ID |
| NAME | No | The name of the application |
| DESCRIPTION | No | A text description of the application |
| REG | No | 'YES' if the user is registered for this application. 'NO' if they are not. |

7.3.4 Example

This package would be sent to confirm the example request in section 7.2.4;

```
{wrapper tags}
<REGCONFIRM>
        <VALUE>CONFIRM</VALUE>
```

APPENDIX "A": ARML Specification

```
<APPS>
    <APP ID="4" NAME="EMAIL" DESCRIPTION="E-Mail Application" REG="YES">
    <APP ID="22" NAME="STOCKS" DESCRIPTION="Stock Quotes" REG="NO">
</APPS>
</REGCONFIRM>
{wrapper tags}
```

APPENDIX "A": ARML Specification

7.4 Find applications package
7.4.1 Description
Find applications packages are sent from the AIRIX component to the AIRIX server when a user wishes to refresh their list of applications on a device

7.4.2 Structure
A device registration package has the following structure;

```
{wrapper tags}
<FINDAPPS>
</FINDAPPS>
{wrapper tags}
```

7.4.3 Tags

7.4.3.1 The <FINDAPPS> tag
The <FINDAPPS>...</FINDAPPS> pair delimit the application registration request. It has no attributes.

APPENDIX "A": ARML Specification

7.5 Find applications confirmation package

7.5.1 Description

This package is sent back from the AIRIX server to the AVM to and contains a list of applications available for the user

7.5.2 Structure

A registration confirmation package has the following structure;

```
{wrapper tags}
<FINDAPPSCONFIRM>
    <APPS>
        <APP></APP>
        <APP></APP>
    </APPS>
</FINDAPPSCONFIRM>
{wrapper tags}
```

7.5.3 Tags

7.5.3.1 The <FINDAPPSCONFIRM> tag

The <FINDAPPSCONFIRM>...</FINDAPPSCONFIRM> pair delimit the confirmation. The tag has no attributes.

7.5.3.2 The <APPS> tag

The <APPS>...</APPS> pair contains a list of applications for the device.

7.5.3.3 The <APP> tag

The <APP>...</APP> pair contains an application header. It has the following attributes;

| Attribute | Optional? | Description |
| --- | --- | --- |
| ID | No | The application ID |
| NAME | No | The name of the application |
| DESCRIPTION | No | A text description of the application |
| REG | No | 'YES' if the user is registered for the application. 'NO' if they are not. |

APPENDIX "A": ARML Specification

7.6 Application Registration & deregistration package

7.6.1 Description

Application registration packages are sent from the AIRIX component to the AIRIX server when a user wishes to register or deregister for an application.

7.6.2 Structure

A device registration package has the following structure;

```
{wrapper tags}
<APPREG>
</APPREG>
{wrapper tags}
```

7.6.3 Tags

7.6.3.1 The <APPREG> tag

The <APPREG>...</APPREG> pair delimit the application registration request. The tag has the following attributes;

| Attribute | Optional? | Description |
|---|---|---|
| TYPE | No | This defines the type of parameter. It can take two values; ADD – this means that the application is to be added to the registration database DELETE – this means that the application is to be removed to the registration database |
| ID | No | The ID of the application being registered/deregistered |

APPENDIX "A": ARML Specification

7.7 Application registration & deregistration confirmation package

7.7.1 Description
This packages is sent back from the AIRIX server to the AVM to confirm that the applicaiton has been registered or deregistered.

7.7.2 Structure
A registration confirmation package has the following structure (note that for DELETE types, the <INTERFACE>...</INTERFACE> section will not be included);

```
{wrapper tags}
<APPREGCONFIRM>
        <INTERFACE>
               interface definition
        </INTERFACE>
</APPREGCONFIRM>
{wrapper tags}
```

7.7.3 Tags

7.7.3.1 The <APPREGCONFIRM> tag
The <APPREGCONFIRM>...</APPREGCONFIRM> pair delimit the confirmation. The tag has the following attributes;

| Attribute | Optional? | Description |
| --- | --- | --- |
| TYPE | No | This defines the type of parameter. It can take two values; ADD – this means that the application is to be added to the registration database DELETE – this means that the application is to be removed to the registration database |
| ID | Yes | The ID of the application being returned (if any) |

7.7.3.2 The <INTERFACE> tag
The <INTERFACE>...</INTERFACE> pair delimit the interface definition. The tag has the no attributes, and contains an interface definition as laid out in section 3. Note that instead of the <DEVICES>...</DEVICES> tags in section 3.1.3.6, it will be replaced by <SCREENS>...<SCREENS> with the screen definitions for only the one device that the interface is being sent to (see section 3.4.3.2 for the definition of the <SCREENS> tag). This section will not be sent for APPREGCONFIRM messages of TYPE="DELETE".

7.7.4 Example
The following example shows the application confirmation with screen definitions for an application that allows a user to view their inbox and the mails in it.

```
{wrapper tags}
<APPREGCONFIRM TYPE="ADD" ID="12">
        <INTERFACE>
               <AXSCHDEF>
                                             <EVENTS>
                                                  <EVENT>
                                     (action definitions)
                                                  </EVENT>
                                             </EVENTS>
                      <AXTDEFS>
                             (table definitions)
                      </AXTDEFS>
```

APPENDIX "A": ARML Specification

```
            <DPACKETS>
                    (data package definitions)
            </DPACKETS>

<SCREENS>
                    <SCREEN NAME="INBOX ">
                            (screen definition)
                    </SCREEN>
                    <SCREEN NAME="VIEWNEWMAIL">
                            (screen definition)
                    </SCREEN>
            </SCREENS>
        </AXSCHDEF>
    </INTERFACE>
</APPREGCONFIRM>
{wrapper tags}
```

APPENDIX "A": ARML Specification

7.8 Setting the active device package

7.8.1 Description
If a user wishes to set the current device as their active device, the AVM must send a 'set active device' package to the AIRIX server

7.8.2 Structure
A 'set active device' package has the following structure;

```
{wrapper tags}
<SA>
{data}
</SA>
{wrapper tags}
```

7.8.3 Tags

7.8.3.1 The <SA> tag
The 'set active device' package is shown by the <SA>...</SA> tags. The tag has no attributes; the tag pair contains the user's username

7.8.4 Example
This package would be sent by a user with the username of 'scotty';

```
{wrapper tags}
<SA>scotty</SA>
{wrapper tags}
```

7.9 Set active device response

7.9.1 Description
This packages is sent back from the AIRIX server to the client in response to a request to set the current device as the active one.

7.9.2 Structure
A 'set active device response' package has the following structure;

```
{wrapper tags}
<SACONFIRM>
        <VALUE> {data} </VALUE>
</SACONFIRM>
{wrapper tags}
```

7.9.3 Tags

7.9.3.1 The <SACONFIRM> tag
The <SACONFIRM>...</SACONFIRM> pair delimit the confirmation. The tag does not have any attributes.

7.9.3.2 The <VALUE> tag
The <VALUE>...</VALUE> pair contains the status of the registration request. The following text strings are allowable;

CONFIRM – this means that the registration request was successful

APPENDIX "A": ARML Specification

NOTREGISTERED – this means that the registration request failed because

7.9.4 Example
This package would be sent by the AIRIX server to confirm a set active request;

```
{wrapper tags}
<SACONFIRM>
      <VALUE>CONFIRM</VALUE>
</SACONFIRM>
{wrapper tags}
```

7.10 Invalid Application package
7.10.1 Description
This package is sent back from the AIRIX server to the AVM in response to a request to interact with an application that is no longer registered with AIRIX.

7.10.2 Structure
An 'invalid application' package has the following structure;

```
{wrapper tags}
<NOAPP>
      <VALUE> {data} </VALUE>
</NOAPP>
{wrapper tags}
```

7.10.3 Tags

7.10.3.1 The <NOAPP> tag
The <NOAPP>...</NOAPP> pair delimit the confirmation. The tag has no attributes.

7.10.3.2 The <VALUE> tag
The <VALUE>...</VALUE> pair delimit the return code. It can only be
NOAPPLICATION – Application not found.

7.10.4 Example
This package would be sent in response to a request if the application cannot be found;

```
{wrapper tags}
<NOAPP>
      <VALUE>NOAPPLICATION</VALUE>
</NOAPP>
{wrapper tags}
```

8 Application-Server System Interactions

The section that defines Application to server system interactions has been made obsolete by the document "AIRIX Polling XML Language Specification". It describes an XML-HTTP interface to AIRIX using POST and GET commands to a web-based ISAPI DLL.

APPENDIX "A": ARML Specification

9 ARML future developments

The following enhancements to ARML are planned;

- Tokenisation
- Support for on-line help
- Compression techniques
- Enhanced editboxes
    - input masks
    - multi-value entry
- Multiple selection list boxes
- A per-application splash screen

What is claimed is:

1. An apparatus comprising:
at least one processor; and
a memory coupled to said at least one processor storing:
a markup language document containing:
a markup language element hierarchy having a parent markup language element and a contained set of markup language elements; and
a plurality of references to said markup language element hierarchy, each of said plurality of references being a further markup language element having an attribute identifying said parent markup language element of said markup language element hierarchy; and
machine-executable code which, when executed by the at least one processor, generates, from said markup language document, another markup language document containing one instance of said set of markup language elements for each of said plurality of references,
wherein said parent markup language element has an attribute with a unique value, wherein said attribute of each said further markup language element identifies said parent markup language element by said unique attribute value, and wherein said generated markup language document lacks said parent markup language element.

2. The apparatus of claim 1 wherein said markup language is Extensible Markup Language (XML), said markup language document is an XML document, said set of markup language elements is a set of XML elements, and the generated markup language document is another XML document.

3. The apparatus of claim 1 wherein each of said markup language elements of said set is representative of a wireless communication device action and wherein said markup language element hierarchy has a parent markup language element representative of an aggregation of wireless communication device actions.

4. The apparatus of claim 3 wherein said wireless communication device action is any of displaying a message box, sending a markup language message, terminating an application, closing a graphical user interface (GUI) screen, executing a conditional if-then-else expression, playing a notification sound, opening a specified GUI screen, purging a buffer, refreshing a displayed GUI screen or saving a value to the buffer.

5. The apparatus of claim 1 wherein each of said markup language elements of said set is an instance of the same markup language element.

6. A non-transitory machine-readable medium comprising:
machine-executable code that, upon execution by a processor, generates, from a markup language document containing:
a markup language element hierarchy having a parent markup language element and a contained set of markup language elements; and
a plurality of references to said markup language element hierarchy, each of said plurality of references being a further markup language element having an attribute identifying said parent markup language element of said markup language element hierarchy,
another markup language document containing one instance of said set of markup language elements for each of said plurality of references,
wherein said parent markup language element has an attribute with a unique value, wherein said attribute of said further markup language element identifies said parent markup language element by said unique attribute value, and wherein said generated markup language document lacks said parent markup language element.

7. The machine-readable medium of claim 6 wherein said markup language is Extensible Markup Language (XML), said markup language document is an XML document, said set of markup language elements is a set of XML elements, and the generated markup language document is another XML document.

8. The machine-readable medium of claim 6 wherein each of said markup language elements of said set is representative of a wireless communication device action and wherein said markup language element hierarchy has a parent markup language element representative of an aggregation of wireless communication device actions.

9. The machine-readable medium of claim 8 wherein said wireless communication device action is any of displaying a message box, sending a markup language message, terminating an application, closing a graphical user interface (GUI) screen, executing a conditional if-then-else expression, playing a notification sound, opening a specified GUI screen, purging a buffer, refreshing a displayed GUI screen or saving a value to the buffer.

10. The machine-readable medium of claim 6 wherein each of said markup language elements of said set is an instance of the same markup language element.

11. A method comprising:
generating, from a markup language document containing:
a markup language element hierarchy having a parent markup language element and a contained set of markup language elements; and
a plurality of references to said markup language element hierarchy, each of said plurality of references being a further markup language element having an attribute identifying said parent markup language element of said markup language element hierarchy,
another markup language document containing one instance of said set of markup language elements for each of said plurality of references,
wherein said parent markup language element has an attribute with a unique value, wherein said attribute of said further markup language element identifies said parent markup language element by said unique attribute value, and wherein said generated markup language document lacks said parent markup language element.

12. The method of claim 11 wherein said markup language is Extensible Markup Language (XML), said markup language document is an XML document, said set of markup language elements is a set of XML elements, and the generated markup language document is another XML document.

13. The method of claim 11 wherein each of said markup language elements of said set is representative of a wireless communication device action and wherein said markup language element hierarchy has a parent markup language element representative of an aggregation of wireless communication device actions.

14. The method of claim 13 wherein said wireless communication device action is any of displaying a message box, sending a markup language message, terminating an application, closing a graphical user interface (GUI) screen, executing a conditional if-then-else expression, playing a notification sound, opening a specified GUI screen, purging a buffer, refreshing a displayed GUI screen or saving a value to the buffer.

15. The method of claim 11 wherein each of said markup language elements of said set is an instance of the same markup language element.

* * * * *